US008354613B2

(12) United States Patent
Sugihashi et al.

(10) Patent No.: US 8,354,613 B2
(45) Date of Patent: Jan. 15, 2013

(54) METHOD OF PRODUCING COMMON RAIL AND LOCALLY REINFORCED COMMON RAIL

(75) Inventors: Atsushi Sugihashi, Tokyo (JP); Koji Hirano, Tokyo (JP); Yasushi Hasegawa, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 542 days.

(21) Appl. No.: 12/448,581

(22) PCT Filed: Nov. 12, 2008

(86) PCT No.: PCT/JP2008/070971

§ 371 (c)(1),
(2), (4) Date: Jun. 24, 2009

(87) PCT Pub. No.: WO2009/064013

PCT Pub. Date: May 22, 2009

(65) Prior Publication Data

US 2010/0055490 A1 Mar. 4, 2010

(30) Foreign Application Priority Data

Nov. 12, 2007 (JP) ................................ 2007-293334

(51) Int. Cl.
*B23K 26/00* (2006.01)

(52) U.S. Cl. .......... 219/121.85; 219/121.61; 219/121.84

(58) Field of Classification Search ............. 219/121.85, 219/121.61, 121.84; 123/456, 447, 468
See application file for complete search history.

(56) References Cited

U.S. PATENT DOCUMENTS 5,265,793 A * 11/1993 Usui et al. .................... 228/127
7,900,603 B2 * 3/2011 Hasegawa et al. ............ 123/456
(Continued)

FOREIGN PATENT DOCUMENTS

JP 02-151377 6/1990
(Continued)

OTHER PUBLICATIONS

International Search Report dated Feb. 24, 2009 issued in corresponding PCT Application No. PCT/JP2008/070971.

*Primary Examiner* — M. Alexandra Elve
(74) *Attorney, Agent, or Firm* — Kenyon & Kenyon LLP

(57) ABSTRACT

This invention relates to a method producing a common rail excellent in fatigue strength from an inexpensive steel which uses as the material of the common rail a steel for high-strength liquid phase diffusion bonding having good toughness and fatigue strength, which steel contains, in mass %, C: 0.01 to 0.3%, Si: 0.01 to 0.5%, Mn: 0.01 to 3.0%, Cr: 1.0 to 12.0% and Mo: 0.1 to 2.0%, further contains, in mass %, V: 0.01 to 1.0%, B: 0.0003 to 0.01%, Ti: 0.01 to 0.05% and N: 0.001 to 0.01%, has P content limited to 0.03% or less, S content to 0.01% or less and O content to 0.01% or less, further has total content of grain boundary segregated embrittling elements As, Sn, Sb, Pb and Zn limited to 0.015% or less, and a balance of unavoidable impurities and Fe. The steel is used for liquid phase diffusion bonding. The production method uses a pulsed laser beam to perform laser-peening in the presence of a transparent liquid with respect to the vicinity of the boundary between the inner surface 21 of each branch hole 6 and the inner surface 22 of the rail hole 5, located at an opening peripheral zone of the branch hole 6. The surface layer of steel of the opening peripheral zone is thereafter removed.

11 Claims, 20 Drawing Sheets

U.S. PATENT DOCUMENTS

| | | | | |
|---|---|---|---|---|
| 2005/0156057 | A1* | 7/2005 | Hamann et al. | 239/102.2 |
| 2006/0169253 | A1* | 8/2006 | Usui et al. | 123/468 |
| 2007/0138157 | A1* | 6/2007 | Dane et al. | 219/121.85 |
| 2007/0262063 | A1* | 11/2007 | Sano et al. | 219/121.85 |
| 2008/0298991 | A1* | 12/2008 | Trubnikov | 417/521 |

FOREIGN PATENT DOCUMENTS

| | | | |
|---|---|---|---|
| JP | 07-276066 | | 10/1995 |
| JP | 09-323175 | | 12/1997 |
| JP | 07-246483 | | 11/2002 |
| JP | 2003-214291 | | 7/2003 |
| JP | 2004-027968 | | 1/2004 |
| JP | 2004-083979 | | 3/2004 |
| JP | 2004-114157 | | 4/2004 |
| JP | 2004-204714 | | 7/2004 |
| JP | 2004204714 | A * | 7/2004 |
| JP | 2006-218541 | | 8/2006 |
| JP | 2006-322446 | | 11/2006 |
| JP | 2007-40244 | | 2/2007 |
| JP | 2007-237192 | | 9/2007 |
| JP | 2007284711 | A * | 11/2007 |
| JP | 2008-119744 | | 5/2008 |

* cited by examiner

METHOD OF PRODUCING COMMON RAIL AND LOCALLY REINFORCED COMMON RAIL

This application is a national stage application of International Application No. PCT/JP2008/070971, filed 12 Nov. 2008, which claims priority to Japanese Application No. 2007-293334, filed 12 Nov. 2007, of which is incorporated by reference in its entirety.

FIELD OF THE INVENTION

This invention relates to a method producing a common rail for a diesel engine accumulator fuel-injection system and to a locally reinforced common rail.

DESCRIPTION OF THE RELATED ART

A machine component having a fluid passage is liable to experience stress concentration at the ends of the fluid-conveying tube and regions of the tube where its diameter changes radically so that fatigue fracture caused by fluid pressure fluctuation becomes an issue.

A common rail is a tubular component used in a diesel engine accumulator fuel-injection system. It is situated between a pump for pumping diesel fuel and injectors and stores fuel under pressure.

FIG. 1 is a schematic cross-section of a common rail 1. The rail hole 5, which is the main pipe of the common rail 1, functions to store pressurized diesel fuel. The common rail 1 is formed with a number of branch holes 6 extending normal to the rail hole 5. Diesel fuel is pumped through the branch holes 6 to associated injectors. The rail hole 5 has an inside diameter $d_1$ of about 10 mm, and the branch holes 6 have an inside diameter $d_2$ of about 1 mm. During engine operation, diesel fuel is periodically pumped and the pressure of the diesel fuel in the common rail 1 therefore varies periodically. In the course of the periodic pressure variation, the rail hole 5 and the branch holes 6 shown in FIG. 1 experience periodic variation in circumferential tensile stress. FIG. 2 shows an enlarged view of the boundary peripheral region between the inside surface of a branch hole 6, which is the opening peripheral region of the branch hole 6, and the inside surface of the rail hole 5. Among the different sectors of the opening peripheral region of the branch hole 6, the zones 7 near the opposite ends of the diameter of the branch hole 6 parallel to the longitudinal direction of the rail hole experience greater tensile stress than other zones because they are sites where the tensile stresses of the two holes 5 and 6 are added. These zones therefore tend to undergo fatigue fracture owing to internal pressure variation. Improvement of fatigue strength against internal pressure variation (internal pressure fatigue strength) would enable high-pressure injection of fuel and is therefore desirable from the aspects of clean exhaust gas and fuel efficiency.

Up to now, improvement of fatigue strength has generally been approached by using high-strength steel to increase the fatigue strength of the common rail. However, this method degrades formability and workability owing to the high strength of the steel and increases cost in proportion to steel performance enhancement. In response to these problems, Japanese Patent Publication (A) No. 2004-83979, for example, teaches an invention that replaces the conventional method of producing a common rail by monolithic forging and mechanical processing with a method of producing a welded common rail by liquid phase diffusion bonding. Further, Japanese Patent Publication (A) No. 2007-40244 teaches an invention related to a steel suitable for liquid phase diffusion bonding that does not require controlled cooling during bonding. However, the steel taught by this patent reference has tensile strength of about 600 MPa and as such is deficient in strength for use in 1,500 atm or even 2,000 atm and higher pressure common rails needed to realize the high-fuel efficiency aimed at in recent years. Although steel strength can be markedly improved by selection of heat treatment conditions and the like, this approach makes processing difficult and greatly increases production cost. In addition, in the case where the processing exposes oxides and/or inclusions such as MnS, $Al_2O_3$, CaO and the like at the surface of the maximum principal stress regions, the oxides and/or inclusions become fatigue fracture starting points during internal pressure application. This seriously impairs stable production of high-strength common rails and is a problem that cannot be overcome.

Moreover, attempts have not been limited to the ordinary method of increasing steel strength. Regarding common rail strength, for example, Japanese Patent Publication (A) Nos. 2004-204714 and 2004-27968 teach methods of mitigating stress concentration by using fluid polishing or coining treatment to chamfer the edges of the branch hole opening region edges. Improvement of fatigue strength by imparting compressive stress has also been studied. Laser peening is one technology that has been developed. A liquid or other transparent medium is provided on the surface of a metal object and a pulsed laser beam of high peak power density is directed onto the metal surface. The expansion reaction force of the plasma produced thereat is utilized to impart residual compressive stress near the surface of the metal object. A method utilizing this technology is taught by Japanese Patent No. 3373638, for example. A laser beam can be transmitted even to narrow regions such as the inner surface of the rail hole and the inner surfaces of the branch holes of the common rail, so that laser peening is currently the only method available for imparting high compressive stress in the vicinity of the branch hole openings of the common rail. Thus, as can be seen from Japanese Patent Publication (A) No. 2006-322446, effective methods for applying laser peening to common rails are being explored.

But while the method taught by Japanese Patent Publication (A) No. 2006-322446 enables considerable improvement of common rail fatigue strength, it has the following drawbacks from the aspects of system and effect. When the laser beam is directed onto the sample surface during laser peening, the surface layer at and around the laser spot melts and resolidifies, so that the surface layer near the laser spot often declines in compressive stress. A known way to avoid this problem is to provide a sacrifice layer for absorbing the laser beam. However, a complex system is required for setting the sacrifice layer at the branch hole opening regions of the common rail. This process is therefore best avoided from the viewpoint of cost and productivity.

Japanese Patent No. 3373638 teaches two methods for removing heat affected regions. In one, an electrode facing the laser-beam-exposed surface and its vicinity is installed, and a laser-beam-controlled electric discharge is produced between the electrode and the surface. In the other, a transparent liquid is provided in contact with the laser-beam-exposed surface for use as an electrolyte and electrolytic polishing is conducted between an electrode installed facing the laser-beam exposed surface and near the surface irradiated with the laser beam. However, accurate and stable processing to the desired shape is difficult with these methods because the influence of the laser-beam irradiation is great. The methods are therefore unsuitable for industrial manufacture of common rails. As reported in Japanese Patent Publication (A) No. 2006-322446, the aforesaid problem of compressive stress decline is mitigated by increasing the superimposed area of the adjacent pulsed laser beam spots. However, in order to boost the effect of improving common rail fatigue strength to a still higher level, it is necessary to maximize the compressive stress near the surface layer. A different approach is therefore desired.

SUMMARY OF THE INVENTION

The object of the present invention is to overcome the aforesaid problems by providing a method of producing a common rail excellent in fatigue strength from an inexpensive steel by conducting laser-peening with respect to zones that are located near the common rail branch hole openings and are liable to become starting points of fatigue fracture caused by stress concentration. Another object of the invention is to provide a common rail produced by the method.

Through a study conducted for overcoming the aforesaid problems, the present inventors learned that a common rail produced from an inexpensive steel can be markedly improved in fatigue strength by a method that comprises: producing in block units of readily processable shape an inexpensive high-strength steel having strength of 600 MPa or higher suitable for liquid phase diffusion bonding and having a specified composition excellent also in bond strength; forming the steel into the approximate shape of a common rail by liquid phase diffusion bonding; conducting laser-peening to impart compressive stress to zones at rail branch hole opening peripheries where fatigue strength is a concern; and conducing electrolytic polishing or the like to remove steel of regions including the laser-peened zones. Liquid phase diffusion bonding is used to attach a holder for fastening a tube outward of each branch hole. This facilitates processing of the high-strength steel, thereby reducing production cost. At the same time, decline in fatigue strength, which occurs when inclusions and/or oxides are exposed at the maximum principal stress regions (branch hole opening regions) and is fatal to a high-strength steel, is compensated by laser-peening regulated for common rail strengthening. These features of the present invention enable low-cost production of a high-pressure-resistant common rail not available heretofore, which can be ascribed to the originality of the present invention.

A first aspect of the present invention provides a method of producing a common rail having a rail hole formed at its center region and having multiple branch holes which are formed in a cylindrical wall region enclosing the rail hole and connected to the rail hole, wherein the method comprises: using as a material of the common rail a steel for high-strength liquid phase diffusion bonding having good toughness and fatigue strength containing, in mass %, C, 0.01 to 0.3%, Si: 0.01 to 0.5%, Mn: 0.01 to 3.0%, Cr: 1.0 to 12.0% and Mo: 0.1 to 2.0%, further containing, in mass %, V: 0.01 to 1.0%, B: 0.0003 to 0.01%, Ti: 0.01 to 0.05% and N: 0.001 to 0.01%, having P content limited to 0.03% or less, S content to 0.01% or less and O content to 0.01% or less, further having total content of grain boundary segregated embrittling elements As, Sn, Sb, Pb and Zn limited to 0.015% or less, and a balance of unavoidable impurities and Fe; conducting liquid phase diffusion bonding; causing a transparent liquid to be present at, and performing laser-peening with a pulsed laser beam with respect to, an inner surface of each branch hole located at an opening peripheral zone of the branch hole and a peripheral zone at a boundary between the branch hole and an inner surface of the rail hole; and removing a surface layer of steel of the opening peripheral zone, thereby increasing the fatigue strength of the opening peripheral zone.

A second aspect of the present invention provides a method of producing a common rail according to the first aspect of the invention, wherein the material used is a steel for liquid phase diffusion bonding further containing, in mass %, one or more of Ni: 0.01 to 9.0%, Co: 0.01 to 5.0%, Cu: 0.01 to 5.0%, and W: 0.01 to 2.0%.

A third aspect of the present invention provides a method of producing a common rail according to the first or second aspects of the invention, wherein the material used is a steel for liquid phase diffusion bonding further containing, in mass %, one or more of Zr: 0.001 to 0.05%, Nb: 0.001 to 0.05%, Ta: 0.001 to 0.2%, and Hf: 0.001 to 0.2%.

A fourth aspect of the present invention provides a method of producing a common rail according to any of the first to third aspects of the invention, wherein the material used is a steel for liquid phase diffusion bonding further containing, in mass %, one or more sulfide shape control elements selected from among Ca: 0.0005 to 0.005%, Mg: 0.0005 to 0.005%, Ba: 0.0005 to 0.005% and the like, and rare earth elements selected from among Y: 0.001 to 0.05%, Ce: 0.001 to 0.05%, La: 0.001 to 0.05% and the like.

A fifth aspect of the present invention provides a method of producing a common rail according to any of the first to fourth aspects of the invention, wherein the removal of the surface layer of steel of the opening peripheral zone is conducted by electrolytic polishing or fluid polishing.

A sixth aspect of the present invention provides a method of producing a common rail according to any of the first to fifth aspects of the invention, wherein the pulse energy of the pulsed laser beam is 1 mJ to 10 J.

A seventh aspect of the present invention provides a method of producing a common rail according to any of the first to sixth aspects of the invention, wherein the laser-peened zone and the zone whose surface layer is removed each includes a zone at the inner surface of the rail hole that satisfies Formula (1) and the thickness of the removed surface layer is 0.01 mm to 0.3 mm at the zone satisfying Formula (1):

Distance from center of branch hole≦Diameter of branch hole×0.6

Angle between line segment drawn to branch hole center and longitudinal direction of rail hole≦10°  Formula (1).

An eighth aspect of the present invention provides a method of producing a common rail according to any of the first to seventh aspects of the invention, wherein the removal of the surface layer of steel of the opening peripheral zone causes a radius of curvature of a shape line at the opening peripheral zone of the branch hole viewed in a cross-section extending in a longitudinal direction of the rail hole and including a center line of the branch hole to be 15 μm or greater at points of a region satisfying Formula (2):

Diameter of branch hole×0.5≦Distance from center of branch hole≦Diameter of branch hole×0.6  Formula (2)

A ninth aspect of the present invention provides a method of producing a common rail according to any of the first to eighth aspects of the invention, wherein the opening peripheral zone is chamfered before conducting the laser-peening.

A tenth aspect of the present invention provides a method of producing a common rail according to the ninth aspect of the invention, wherein the chamfered zone includes the zone satisfying Formula (1).

An eleventh aspect of the present invention provides a method of producing a common rail according to any of the first to tenth aspects of the invention, wherein the transparent liquid used in the laser-peening is alcohol or water containing a rust inhibitor.

A twelfth aspect of the present invention provides a common rail excellent in fatigue strength property having a rail hole formed at its center region and having multiple branch holes which are formed in a cylindrical wall region enclosing the rail hole and connected to the rail hole, wherein the common rail comprises as its material a steel for high-strength liquid phase diffusion bonding having good toughness and fatigue strength containing, in mass %, C, 0.01 to 0.3%, Si: 0.01 to 0.5%, Mn: 0.01 to 3.0%, Cr: 1.0 to 12.0% and Mo: 0.1 to 2.0%, further containing, in mass %, V: 0.01 to 1.0%, B: 0.0003 to 0.01%, Ti: 0.01 to 0.05% and N: 0.001 to 0.01%, having P content limited to 0.03% or less, S content to 0.01% or less and O content to 0.01% or less, further having total content of grain boundary segregated embrittling elements As, Sn, Sb, Pb and Zn limited to 0.015% or less, and a balance of unavoidable impurities and Fe; an opening peripheral region of each branch hole being shaped to have a radius of curvature of a shape line at the opening peripheral zone of the branch hole viewed in a cross-section extending in a longitudinal direction of the rail hole and including a center line of the branch hole that is 15 μm or greater at points of a region satisfying Formula (2); and compressive stress value normal to the longitudinal direction of the rail hole in the cross-section being −200 MPa or greater.

DETAILED DESCRIPTION OF THE INVENTION

Figure 1:
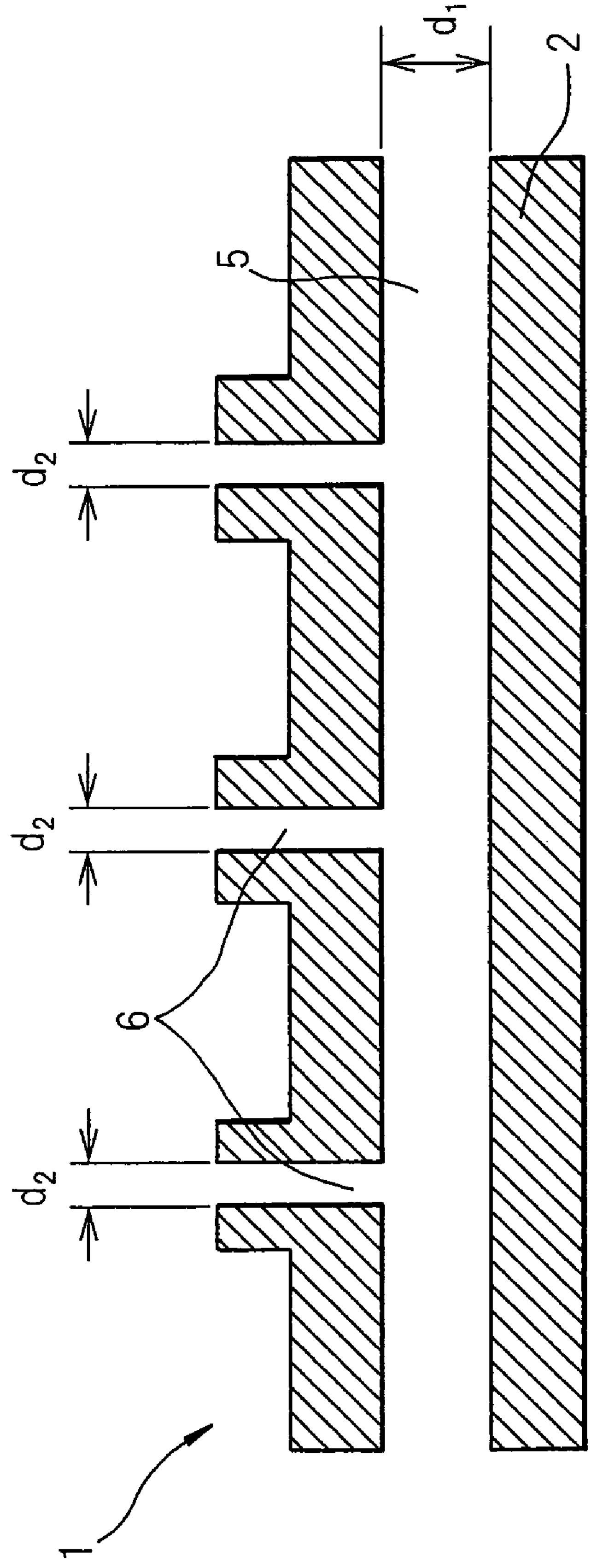
FIG. 1 is a cross-sectional view of a common rail in the longitudinal direction of the rail hole.
Figure 2:
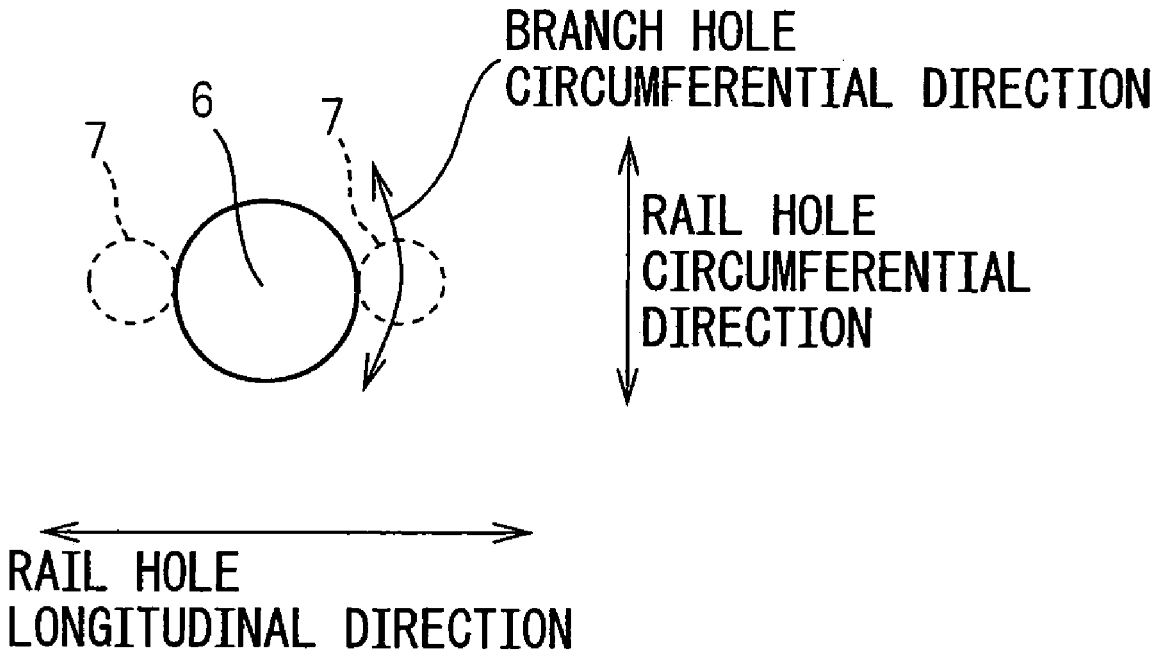
FIG. 2 is a plan view of the peripheral zone of a common rail branch hole opening.

Preferred embodiments of the method of producing a common rail and the common rail according to the present invention are explained in the following with reference to the attached drawings. In order to avoid redundant explanation, elements having substantially the same function are assigned like reference numerals throughout the specification and drawings.

FIG. 1 is a schematic cross-sectional view of a common rail 1. A rail hole 5 formed within a cylindrical wall unit 2 is the main pipe of the common rail 1 and is responsible for storing pressurized diesel fuel. Multiple branch holes 6 extending normal to the rail hole 5 are formed.

Figure 3:
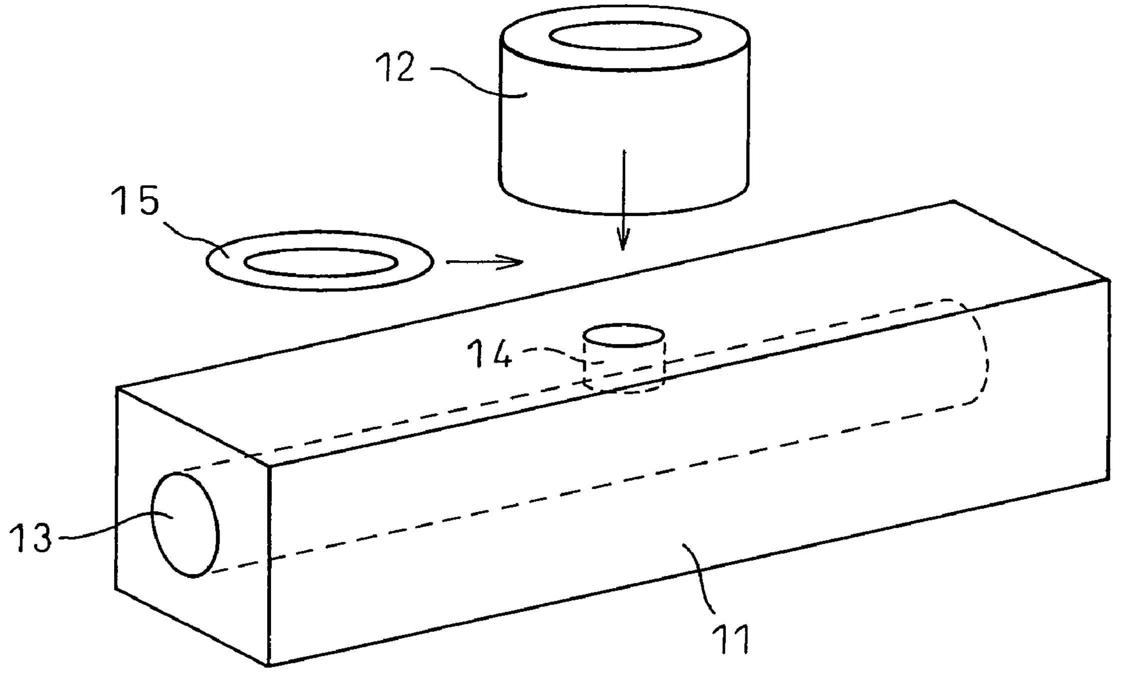
FIG. 3 is a perspective view showing a common rail production process.

In order to provide an inexpensive method of producing a common rail, the present invention performs bonding and assembly by liquid phase diffusion bonding. As shown in FIG. 3, an amorphous alloy metal foil 15 for liquid phase diffusion bonding is interposed between ring-shaped bonding faces formed by a common rail body 11 having a pipe conduit 13 passing therethrough in the longitudinal direction of the rail body and a cylindrically shaped holder 12. After abutment, heating to a temperature of 1,100° C. or greater is performed and stress of 5 MPa or greater is applied to the bonding region at a load equal to or greater than the yield stress of the steel at the bonding temperature, thereby conducting liquid phase diffusion bonding that fusion-upset welds the alloy metal foil 15, common rail body 11 and holder 12, thus initially forming a joint. In the interest of drawing simplicity, only one branch tube 14 is shown FIG. 3. Actually, a number of branch tubes 14 corresponding to the number of injection nozzles installed at the engine combustion chambers is ordinarily provided. In order to connect the branch tubes 14 and tubes for pumping fuel to the injection nozzles of the engine combustion chambers, a number of holders 12 corresponding to the number of branch tubes 14 of the common rail body 11 is provided. In the so-formed common rail, the pipe conduit 13 in FIG. 3 corresponds to the rail hole 5 in FIG. 1, and the interiors of the branch tubes 14 in FIG. 3 correspond to the branch holes 6 in FIG. 1.

In the present invention, a steel is selected in advance at the design state that has adequately low-temperature transformation structure even without need for controlled cooling after liquid phase diffusion bonding, namely a steel having high hardenability capable of inducing bainite or martensite transformation throughout or at required regions of the steel. Thus, a steel is used whose alloy composition is able to achieve an adequately uniform structure even at the region of isothermally solidified joints formed by liquid phase diffusion bonding. The reasons for defining the chemical composition of the liquid phase diffusion bonding steel utilized in the invention will be explained. Unless otherwise stated, the symbol % used with respect to steel components in the following means mass %.

C is the most basic element for controlling steel hardenability and strength. Required strength cannot be achieved at a C content of less than 0.01%. When the content exceeds 0.3%, strength improves but the required toughness of the joint cannot be obtained. C content is therefore defined as 0.01 to 0.3%. When C content is in this range, structural control of the steel is possible in the "as bonded" state of the steel. From the viewpoint of enabling the effects of carbon addition to be realized stably in industrial manufacture, the content thereof should be 0.05 to 0.3%.

Si is a steel deoxidizer that is usually added together with Mn for the purpose of reducing the oxygen concentration of the steel. Si is also necessary for intragranular strengthening and a deficient content lowers strength. In the present invention, too, Si is added for the purpose of deoxidization and intragranular strengthening. These effects are exhibited at a content of 0.01% or greater. At a content exceeding 0.5%, steel embrittlement sometimes occurs. The range of Si addition is therefor defined as 0.01 to 0.5%. In some cases, there is a risk of liquid phase diffusion complex oxides containing $SiO_2$, such as $SiO_2$—MnO and $SiO_2$—FeO, being formed at the liquid phase diffusion bonded joints. In such instances, the range of addition is defined as 0.01 to 0.3%.

Mn, like Si, is effective for deoxidization. When present in the steel, it enhances steel hardenability and contributes to strength improvement. This effect appears at a content of 0.01%. But when the content exceeds 3.0%, toughness may decline owing to crystallization of large MnO-type oxides. The range of Mn addition is therefore defined as 0.01 to 3.0%. The range of Mn addition is more preferably defined as 0.01 to 2.0% in view of the need to inhibit $SiO_2$—MnO formation, similarly to what was explained earlier regarding Si.

Cr and Mo are both important for ensuring good strength/toughness by enhancing steel hardenability Cr does not provide adequate hardenability at a content of less than 1.0%. When the Cr content exceeds 12.0%, formation of δ ferrite may impair formation of a low-temperature transformation structure, so that strength/toughness may decline rather than increase. The range of Cr addition is therefore defined as 1.0 to 12.0%. However, when the foil utilized in liquid phase diffusion bonding contains P, Cr readily forms the Cr phosphide $Cr_2P$ and the upper limit of its range of addition must therefore but lowered, preferably to 1.0 to 9.5%. Mo does adequately improve hardenability when added to a content of less than 0.1%, and when added in excess of 2.0%, it may degrade joint toughness by forming a boride and phosphide with B and P, which are present in the liquid phase diffusion bonding as diffusion atoms. The range of Mo addition is therefore defined as 0.1 to 2.0%. But when the B content of the liquid phase diffusion bonding is high, the possibility of Mo boride being formed cannot always be completely eliminated. Ideally the amount of Mo addition should be controlled based on the B content of the foil. However, the amount of B addition is a factor determining the liquid phase diffusion bonding phenomenon, so that the preferable range is 0.1 to 1.1% as one to be industrially controlled.

V increases steel strength by precipitating fine carbides. This effect is low at a content of less than 0.01%. At a content exceeding 1.0%, the carbides enlarge to reduce toughness. The upper limit of V content is therefore defined as 1.0%. Although V addition is effective for improving strength, it is expensive. V content is therefore preferably defined as 0.01 to 0.5%.

B is very effective for increasing steel hardenability at small content but has only slight hardenability improvement effect at a content of less than 0.0003%. On the other hand, when B is added to a content greater than 0.01%, it forms borocarbides that have the contrary effect of lowering hardenability. The range of B addition is therefore defined as 0.0003 to 0.01%. In another aspect, grain boundary segregation of B is pronounced, and depending on the post-bonding cooling conditions, may cause embrittlement solely at the grain boundaries. The amount added is therefore preferably 0.0003 to 0.005%.

The affinity of Ti to combine with N is stronger than that of B, so that Ti combines with N more preferably than B. Ti is therefore an important element for securing solute B, which is effective for establishing hardenability. This effect is small at a content of less than 0.01%. When Ti is added to a content exceeding 0.05%, not only does its effect saturate but toughness declines owing to abundant precipitation of coarse Ti-type carbonitrides. Ti content must therefore be limited to 0.01 to 0.05%. Further, since Ti also forms borides, the upper limit of Ti content is best held low if possible. The preferable range of addition is therefore 0.01 to 0.03%.

N precipitates TiN and other nitrides. It is therefore effective for increasing steel toughness by crystal grain refinement. This effect is small at a content of less than 0.001%. When the content exceeds 0.01%, cost increases because a large amount of Ti must be added to fix N. N content is therefore defined as 0.001 to 0.01%. In ordinary steelmaking, steady addition of 0.008% or greater N increases cost from the aspect of the production process, The preferred range of addition is therefore 0.001 to 0.008%.

Increasing the toughness of a high-strength steel like that of the present invention requires that concentration of impurities at the grain boundaries be avoided to the utmost possible. With this in mind, the contents of P and S are limited to 0.03% or less and 0.01% or less, respectively. Moreover, in order to achieve a clean steel with high toughness, O content must be limited to 0.01% or less. In addition, reliable achievement of toughness improvement requires that the total content of grain boundary segregated embrittling elements As, Sn, Sb, Pb and Zn be limited to 0.015% or less.

In order to achieve the repeated fatigue strength under high pressure required of a common rail steel, it is highly effective not only to control the steel to the basic chemical composition set out above but also to use a steel whose HTL index of joint hardening specific to a liquid phase diffusion bonded joint as defined by Formula (3) below is 8 or greater, thereby ensuring steel strength of 600 MPa or greater, excellent toughness and good fatigue durability.

$$HTL=3.1\times(Cr\ \%)+1.2(Ni\ \%+Co\ \%+Mn\ \%)+2\times(Mo\ \%+W\ \%)+0.8\times(Nb\ \%+Zr\ \%+V\ \%+Ti\ \%+Ta\ \%+Hf\ \%)+2.7\times(C\ \%+N\ \%)+1{,}500\times(B\ \%) \quad \text{Formula (3).}$$

In deciding the coefficients and combination scheme of Formula (3), reference was made to the coefficients of the hardenability DI value formula generally applied to a steel having the chemical composition set out in the first aspect of the invention (obtained by multiplying the mass % of the respective elements by experimental coefficients and multiplying the linear combinations thereof by the square root of carbon content to obtain a formula estimating the ideal critical hardening diameter, i.e., the distance from the surface of a round bar test piece that becomes martensite structure when the steel is cooled at a given cooling rate), and further, for the purpose of relatively comparing and incorporating the degrees of improvement in steel hardness at the time of individual element cooling, reference was also simultaneously made to the Cr equivalence equation, coefficients were rounded to one decimal place, and the HTL value was determined approximately by adopting 3.1 as the coefficient for the ferrite stabilizing element Cr, 1.2 for the austenite stabilizing elements Ni, Co and Mn, 2.0 for the austenite stabilizing elements Mo and W, 0.8 for the no-recrystallization temperature lowering elements Nb, Zr, V, Ti, Ta, Hf and the like, 2.7 for the interstitial solute elements C and N which are interstitial solute elements present in the steel lattice and promote constitutional supercooling during $\gamma \rightarrow \alpha$ transformation, and for B, since it increases hardenability by markedly inhibiting occurrence of nuclei from the grain boundaries, the relatively large value of 1,500 obtained based on the carbon equivalence equation of welded metal and experimental regression. These coefficients are therefore ones determined for the first time in the course of experimental regression of the strength improvement effect of various hardenability improving elements carried out independently by the inventors while referring to the prior art and, as such, are not simply copied from existing technologies but are important factors that define the unique evaluation method of the present invention.

The HTL value determined in the foregoing manner is a value applicable solely in the present invention. The following experiment and analysis was therefore conducted to determine what level of HTL value makes it possible to achieve steel strength, particularly strength of a joint formed by liquid phase diffusion bonding, of 600 MPa or greater.

Utilizing laboratory scale vacuum-melting or practical steel plate production equipment, steels of chemical compositions falling in the ranges of the first to fourth aspects of the present invention were produced in amounts of 100 kg, 300 kg, 2 ton, 10 ton, 100 ton and 300 ton by vacuum melting or by ordinary processes: blast furnace—converter—secondary refinement—degassing/trace element addition—continuous casting—hot rolling. Samples taken in a direction parallel to the rolling direction of the produced steels were processed into small, simple test pieces measuring 10 mm in diameter and 50 mm in length. An end face of each test piece was ground to Rmax<100 μm (measurement length: 9 mm) and degreased. The so-processed ends of two test pieces were abutted to form a bonding test piece. In a tension-compression testing machine equipped with a 150 kW output high-frequency induction heating unit, a 20 to 50 μm thick amorphous foil at least 50% by volume of which was amorphous and which was capable of achieving liquid phase diffusion bonding at 1,000 to 1,300° C. was interposed between the bonding faces. As the foil was used one of Ni base containing B (see Japanese Patent Publication (A) Nos. H2-151377 and 2008-119744), Fe base containing B (see Japanese Patent Publication (A) No. 2008-119744), Ni base containing P (see Japanese Patent Publication (A) No. H7-276066), Fe base containing P (see Japanese Patent Publication (A) No. H9-323175), or Ni base or Fe base containing P and B (see Japanese Patent Publication (A) No. 2004-114157). The entire test piece was heated to the required-bonding temperature and liquid phase diffusion bonded under stress of 2 to 20 MPa for 1 to 60 min, followed by spontaneous cooling. The cooling rate depended on the equipment and the test piece shape and varied between 0.01° C./s and 10° C./s.

Figure 5:
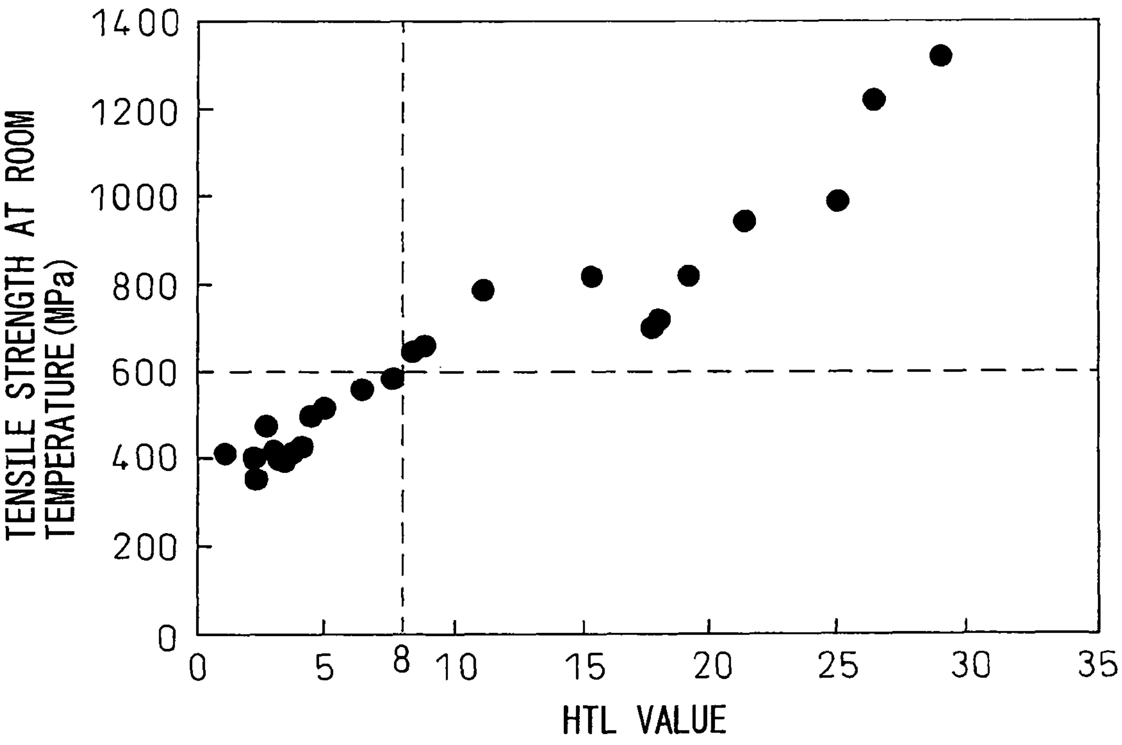
FIG. 5 is a graph showing how tensile strength at room temperature of a liquid phase diffusion bonded joint varies with HTL value.
Figure 6:
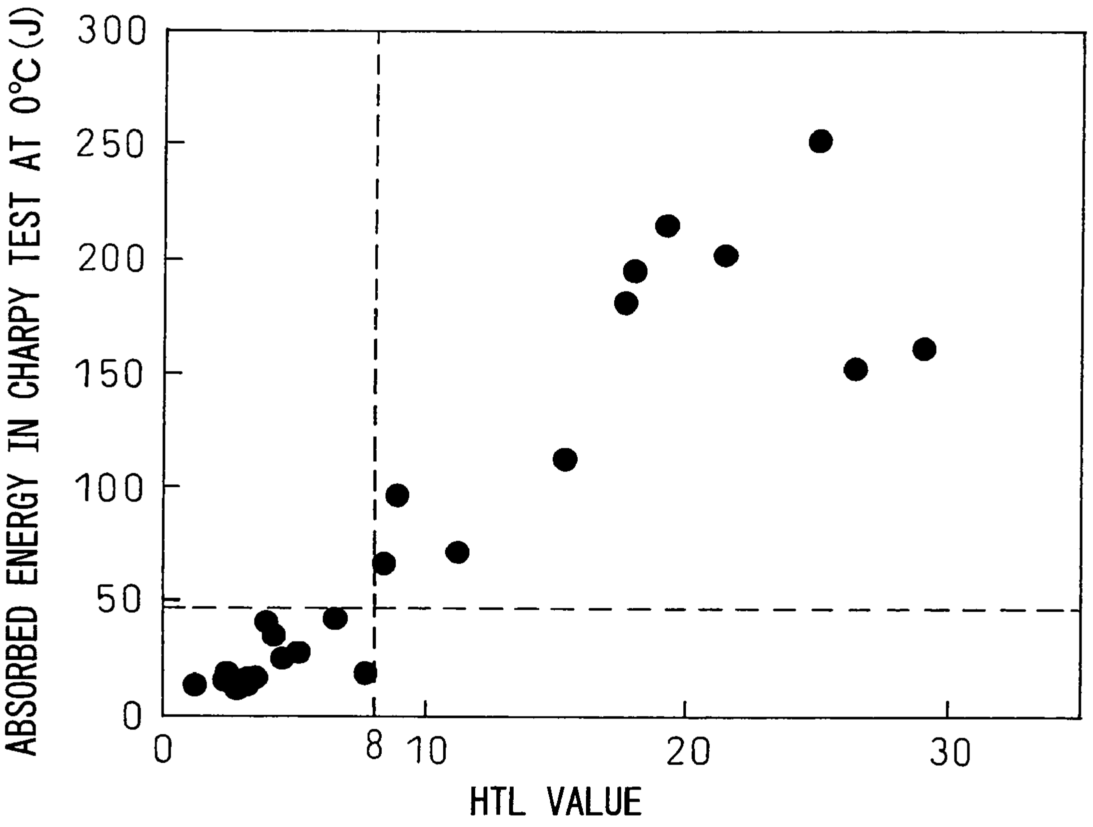
FIG. 6 is a graph showing how toughness of a liquid phase diffusion bonded joint varies with HTL value.

From each of the obtained round bar bonded test pieces was taken a round bar tensile test piece of 6 mm diameter at the parallel portion and from each obtained square bar bonded test piece was taken a 10 mm square JIS No. 4 impact test piece. The bonded region of the round bar test piece was located at the center of the parallel portion and extended parallel to the tensile direction. The Charpy test piece was taken so that a 2 mm V-notch was located at the center of the bonded region. Next, the tensile strength of the steel was measured by the method of JIS Z2241 and its relationship to the aforesaid HTL value was investigated. The results are shown in FIG. 5. The tensile strength of the liquid phase diffusion bonded joint did not exceed 600 MPa unless the HTL value was 8 or greater. The fracture locations in this case were all in the base material when the HTL value was 8 or greater and all in the bonded region when the HTL was less than 8. The relationship between the absorbed energy of the joints determined by Charpy testing in accordance with JIS Z2201 and HTL value is shown in FIG. 6. In order to maintain good toughness (47 J or greater at 0° C.), the HTL value again had to be 8 or greater. In other words, it was ascertained that a liquid phase diffusion bonded joint excellent in strength and toughness can be formed when the HTL value defined by the invention is 8 or greater. Although of the liquid phase diffusion bonded joint according to the invention can simultaneously achieve both strength and toughness equal to or greater than the desired values when the HTL value is 8 or greater, an HTL value of 10 or greater is preferable considering that the highest strength and toughness possible are desirable and that variance arises during industrial production.

In the method of producing a common rail of this invention, a common rail body fabricated of a steel having the composition explained above and cylindrical holders are welded together by liquid phase diffusion bonding, laser-peening is conducted to impart compressive stress to zones at the peripheries of branch hole openings of the common rail body where fatigue strength is a concern, and electrolytic polishing or the like is further conducted to remove steel from the opening peripheries.

Figure 4:
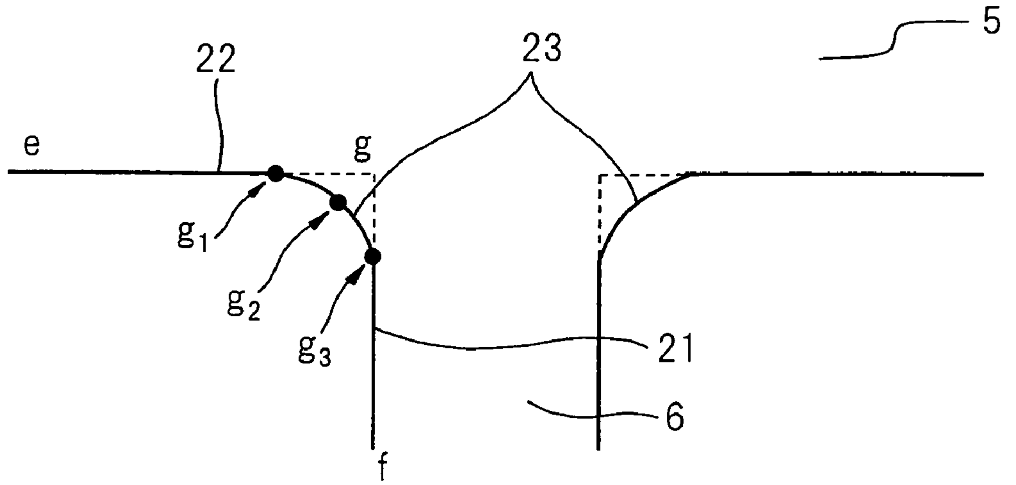
FIG. 4 is a cross-sectional view of the peripheral zone of a common rail branch hole opening.

FIG. 4 is an enlarged cross-sectional view of the opening peripheral zone of a branch hole 6 of the common rail 1 where reinforcement is required. In the first embodiment of the invention local reinforcement method, after the branch hole 6 has been formed, and with the corner egf in FIG. 4 still substantially a right angle, the proximal region designated by the line segment $g_1g_3$ in the drawing is laser-peened to remove steel present near the opening peripheral zone, thereby increasing fatigue strength. In this specification, “branch hole opening peripheral zone” is defined to encompass the region of the rail hole inner surface 22 within a distance of 5 times the diameter of the branch hole from the center of the branch hole, the region of the branch hole inner surface 21 within a distance of 0.3 times the rail hole diameter from the rail hole inner surface, and the connecting surface 23 between the two that connects the branch hole and the rail hole.

The laser-peening method will be explained first. Laser peening requires (i) a laser beam of high peak power density and (ii) provision of a transparent medium such as water in the vicinity of the irradiated surface. Regarding (i), the peak power density at the irradiated surface is defined as 1 to 100 $TW/m^2$. This peak power density is obtained by using a laser system that intermittently emits a laser pulse of a pulse duration of about 10 ps to 100 ns and a pulse energy of about 0.1 mJ to 100 J. As such a laser system can be cited the Nd:YAG laser, but any laser system that satisfies the aforesaid condition (i) is usable. When the conditions (1) and (ii) are satisfied, plasma generated by irradiation with the pulsed laser beam having high peak power density has its expansion restricted by the water or other transparent medium present in the vicinity of the irradiated surface, so that the pressure of the plasma increases. Since the reaction force of the plasma raised to a high pressure plastically deforms the vicinity of the irradiation point, residual compressive stress can be imparted.

Figure 7:
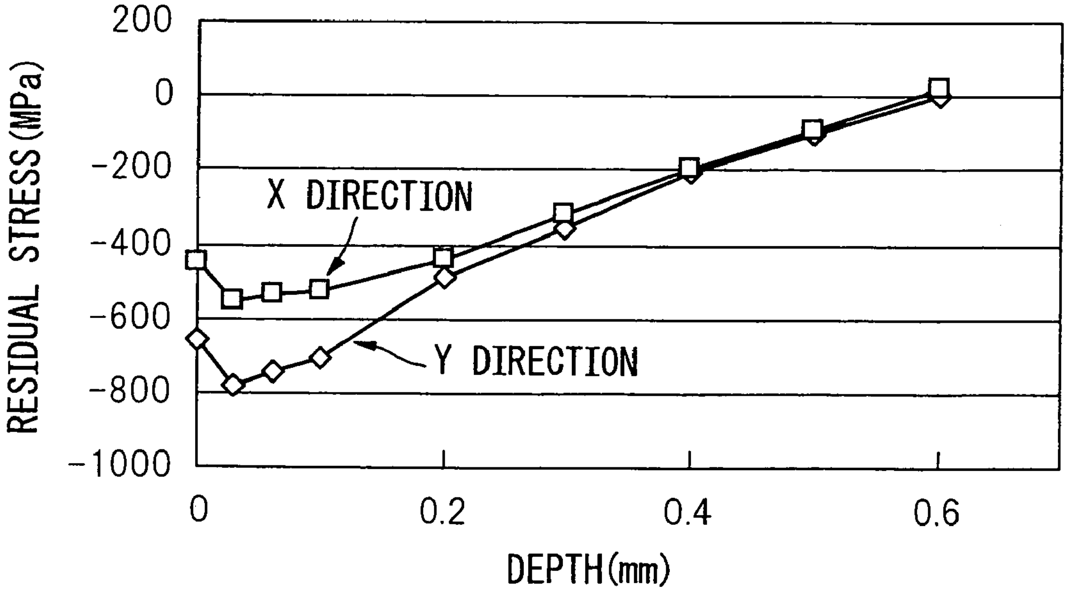
FIG. 7 is a graph showing residual stress of a laser-peened test piece.
Figure 8:
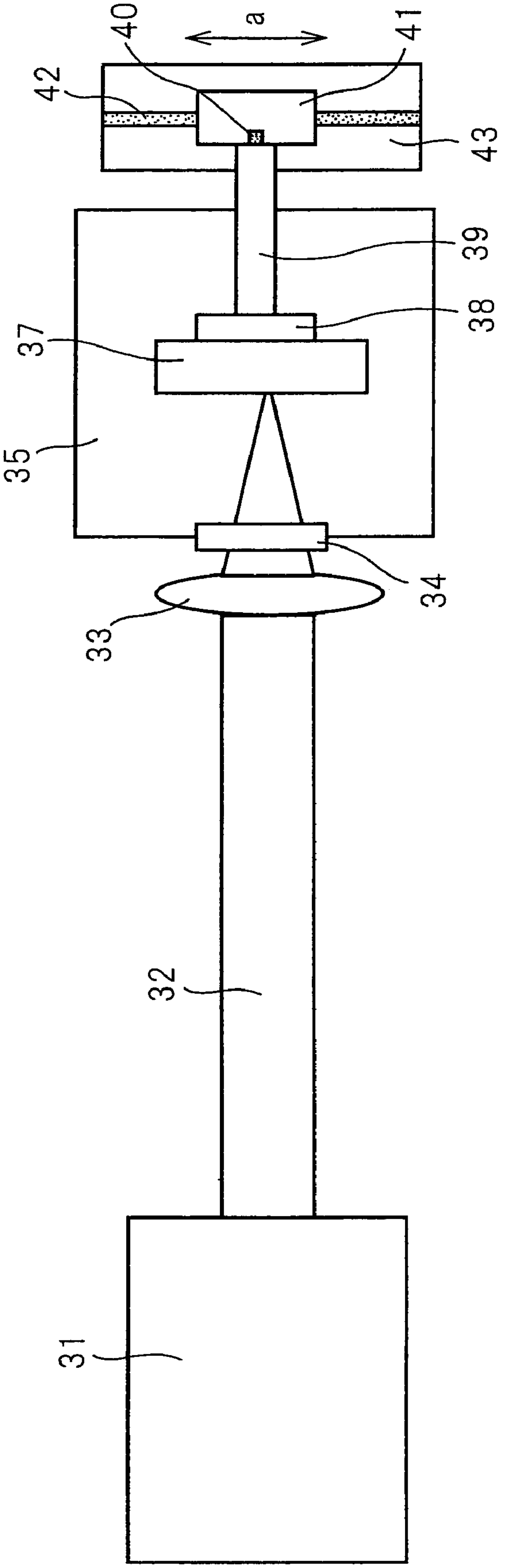
FIG. 8 is a plan view showing a laser beam irradiation apparatus.
Figure 9:
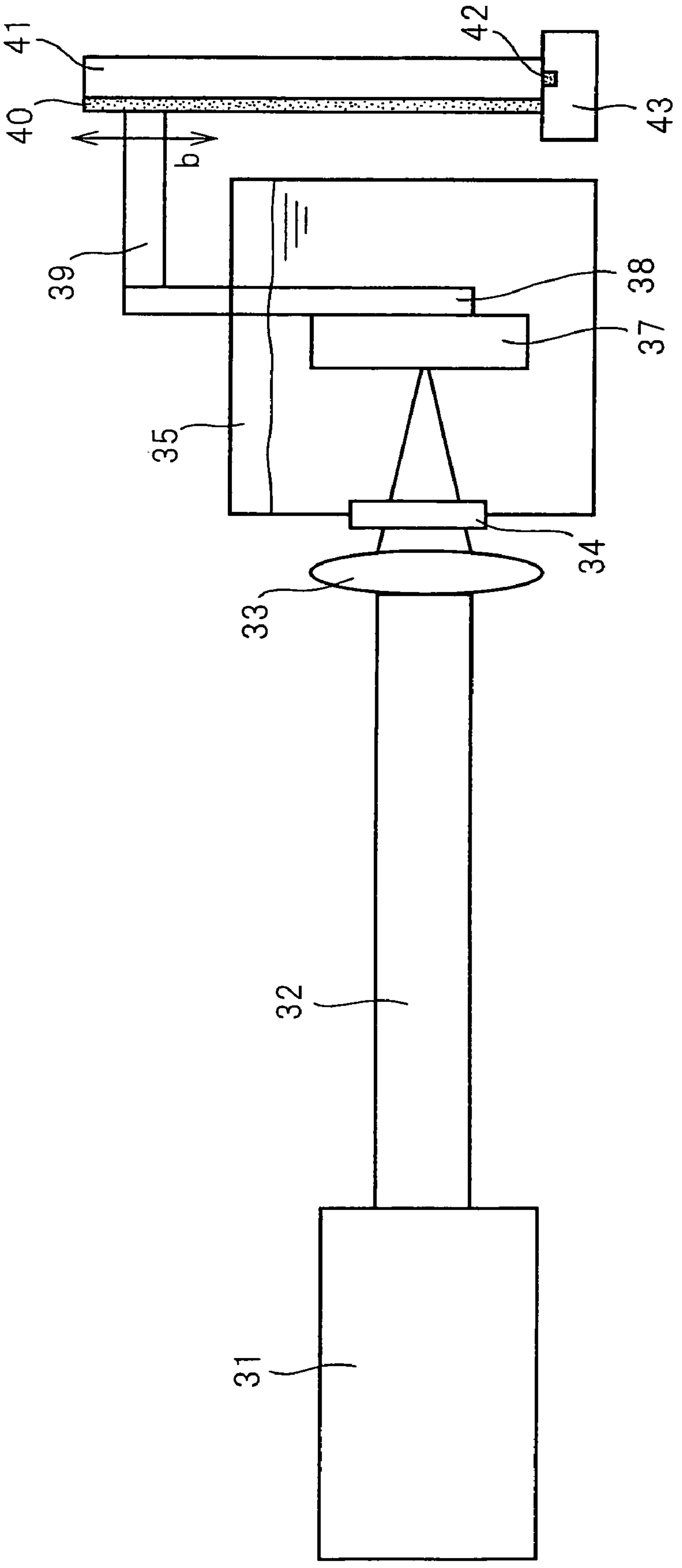
FIG. 9 is a front view of the apparatus shown in FIG. 8.
Figure 10:
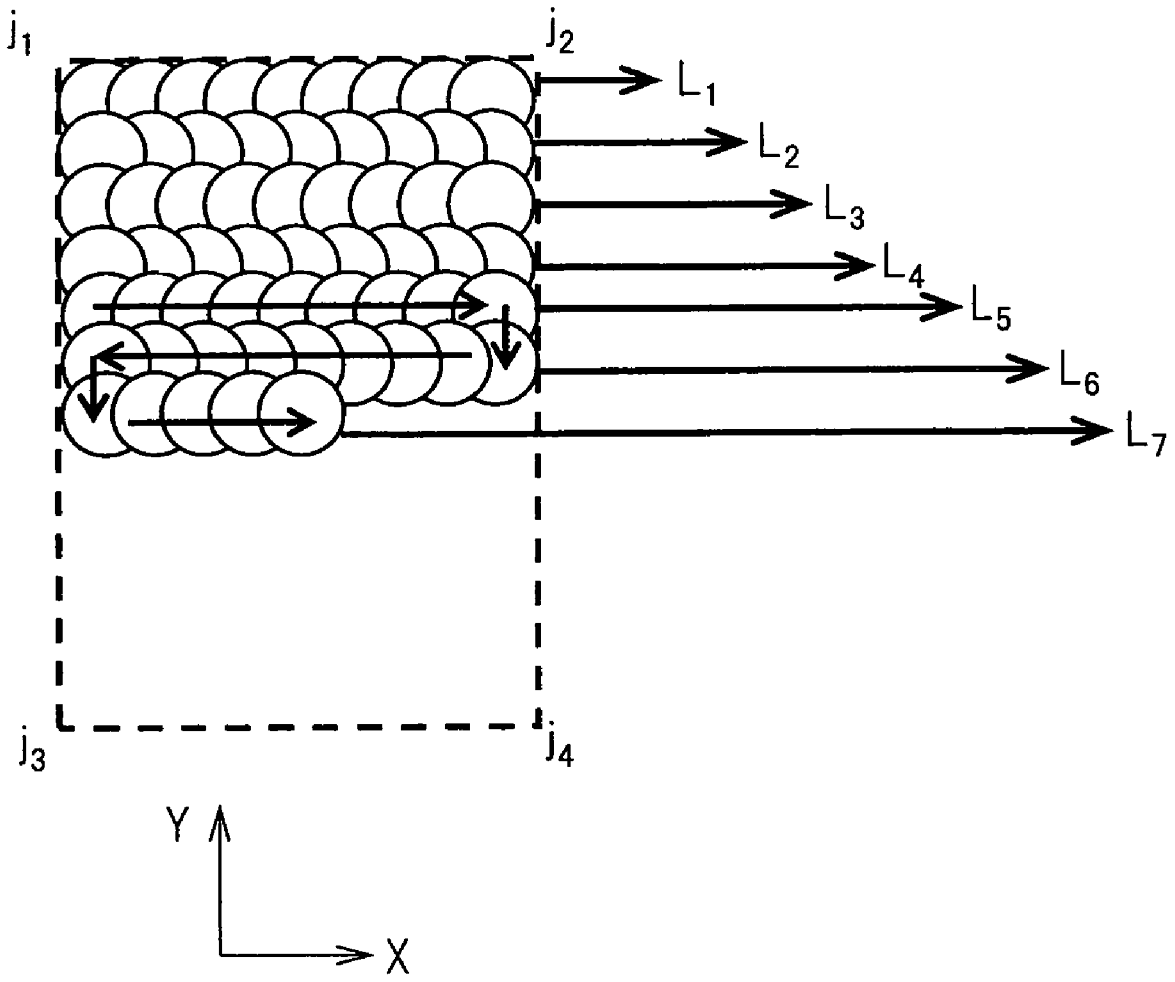
FIG. 10 is a plan view showing a laser beam irradiation method.
Figure 11:
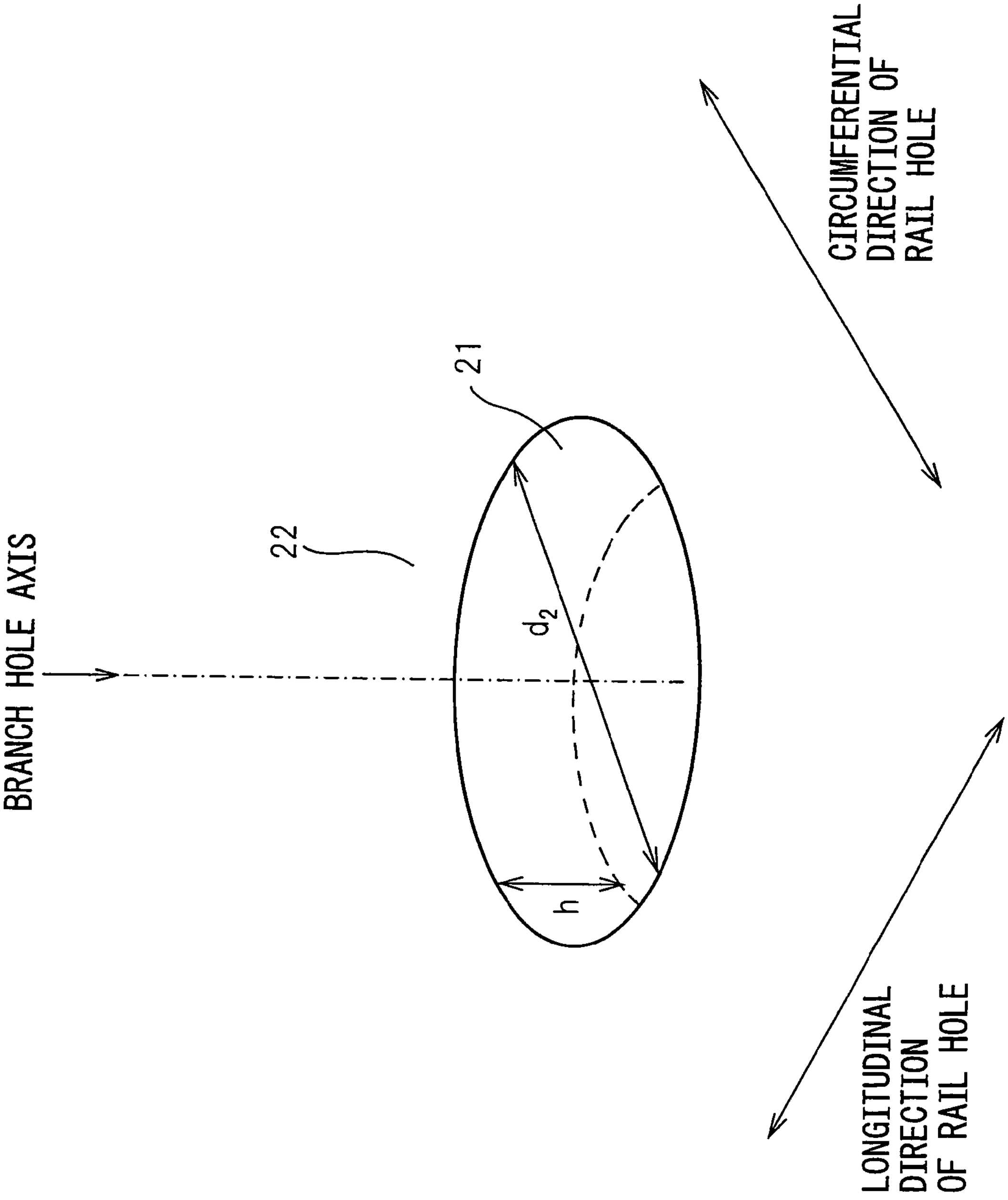
FIG. 11 is a perspective view showing the portion of a branch hole opening peripheral zone to be treated with a laser beam.

In the interest of more clearly explaining the reason for the fatigue-strength improvement by the invention production method, the characteristics of stress introduction by laser-peening will be discussed. FIG. 7 shows the results obtained when a flat plate-like test piece made of a steel having tensile strength of 1,000 MPa was laser-peened and the distribution of the residual stress in the depth direction was measured with an x-ray stress analyzer. The measurement of stress distribution in the depth direction was performed while progressively removing steel by electrolytic polishing. The laser-peening was performed using the apparatus shown in FIG. 8 (plan view) and FIG. 9 (front view). A laser beam 32 from a laser beam generator 31 was directed onto a test piece 37 immersed in water contained in a water tank 35. The second harmonic wave of an Nd: YAG laser (wavelength: 532 nm) was selected as the laser beam because of its good water penetrating power. The laser beam 32 was focused with a focusing lens 33 that was a convex lens of 100 mm focal length and directed onto the test piece 37 through an optical window 34. The beam spot formed on the test piece 37 was circular and had a diameter of 0.8 mm. The pulse energy of the laser was set at 200 mJ and the peak power density at 40 $TW/m^2$. The pulse duration was 10 ns and the pulse repetition frequency was 30 Hz. The rear of the test piece 37 was attached through supports 38, 39 to a guide 40 slidable vertically (in the direction of arrow b) as shown in FIG. 9. As shown in FIG. 8, the guide 40 was connected to a support 41 attached to a guide 42 slidable in the horizontal direction (in the direction of arrow a). The test piece 37 was installed to be movable along the guides 40 and 42 in the a and b directions under the control of a scanner 43. FIG. 10 shows a method for superimposed scanning of the pulsed laser beam spot. The processed region was a 5 mm×10 mm rectangle (in FIG. 10, $j_1j_2$=5 mm, $j_2j_3$=10 mm). The average number of times that a given spot was irradiated with the pulsed laser beam was controlled to 25 and processing was performed to make the interval between adjacent beam spots in a given scanning region Li and the distance between the centers of adjacent scanning regions (e.g., $L_1$ and $L_2$ in FIG. 10) equal to each other. The scanning regions were formed continuously, in the manner of "$L_1 \rightarrow L_2 \rightarrow L_3 \rightarrow \ldots$" in FIG. 10. An examination of the measurement results in FIG. 7 shows that the compressive stress was introduced to a depth of about 0.6 mm. Moreover, owing to the use of the superimposed scanning method shown in FIG. 10, compressive stress in the Y direction in FIG. 10 was selectively strengthened.

As shown in FIG. 7, Y-direction residual stress was −783 MPa at depth of 30 μm, where residual compressive stress was maximum. However, residual stress at the processed steel surface (depth: 0 mm) reached only −656 MPa. Thus, strengthening of surface residual stress was not altogether adequate. This was because when the laser beam was directed onto the sample surface, the surface layer at and around the laser spot melted and resolidified.

In the production method of the invention, the laser-peening explained above is followed by removal of steel from a region including the laser-peened surface. Removal of steel by mechanical polishing has an adverse effect on fatigue properties because it leaves residual tensile stress in the surface after the removal. Electrolytic polishing or fluid polishing is therefore preferably chosen as the removal method. In electrolytic polishing, an etching solution is applied to the opening periphery and in most cases polishing is performed by applying electric current through a spherical projection pressed onto the location being polished. In fluid polishing, polishing is performed by passing a liquid containing an abrasive through the rail hole 5 and branch holes 6. In both methods, polishing proceeds concentrically with the axis of each branch hole 6 at the center. This removal process enables removal of surface layer whose stress was shifted toward the tensile side by melting and resolidification owing to the laser-peening. Since it also relaxes the stress concentration factor by changing the opening periphery shape, the maximum load stress during actual use is reduced. The inventors discovered that these effects act synergistically to greatly improve fatigue strength.

In the preferred embodiments of the invention, the pulse energy of the pulse energy is controlled to the range of 1 mJ to 10 J. The reason for this is as follows: In the invention method, the laser-peening is followed by removal of steel from the surface. If the depth to which compressive stress is introduced by the laser-peening is small, the residual compressive stress at the new surface exposed by the removal is liable to be small. The depth of compressive stress introduction is shallower in proportion as the pulse energy is smaller. This is because the three-dimensional dispersion of the laser pulse energy introduced from the workpiece surface is greater in proportion as the pulse energy is smaller. In view of this constraint, processing is preferably conducted at a pulse energy of 1 mJ or greater in the method of this invention. Considering the cross-sectional area of a laser beam that can be passed through the rail pipe and the optical damage threshold of the optical elements, the upper limit of the pulse energy is preferably defined as 10 J or less.

The regions requiring laser-peening and steel removal depend on component design factors such as the tensile stress distribution of the branch hole opening peripheral zone during fluctuating internal pressure load and the degree to which stress concentration is to be relaxed. Tensile stress distribution, depends on general factors like steel strength, operating pressure, rail hole diameter $d_1$, and branch hole diameter $d_2$. While the distribution can be estimated based on finite element analysis or the like, a general processed region guideline will be given in the following.

After the laser-beam processing and ensuing removal processing, the maximum tensile stress of the branch hole opening peripheral zone under fluctuating internal pressure load during actual use occurs in the vicinity of a region of the longitudinal cross-section of the rail hole 5 including the branch holes 6 that is near the connection region between branch hole inner surface and the surface subjected to removal processing, and the principal stress direction thereof is the peripheral direction of the rail hole 5. In order to improve fatigue strength, high compressive stress is preferably introduced with respect to the region represented by Formula (1) below, which includes the point where the tensile stress assumes maximum value.

Distance from center of branch hole≦Diameter of branch hole×0.6

Angle between line segment drawn to branch hole center and longitudinal direction of rail hole≦10°     Formula (1).

Therefore, the laser-beam processing region of the inner surface 22 of the rail hole 5 preferably includes the region represented by Formula (1).

Figure 15:
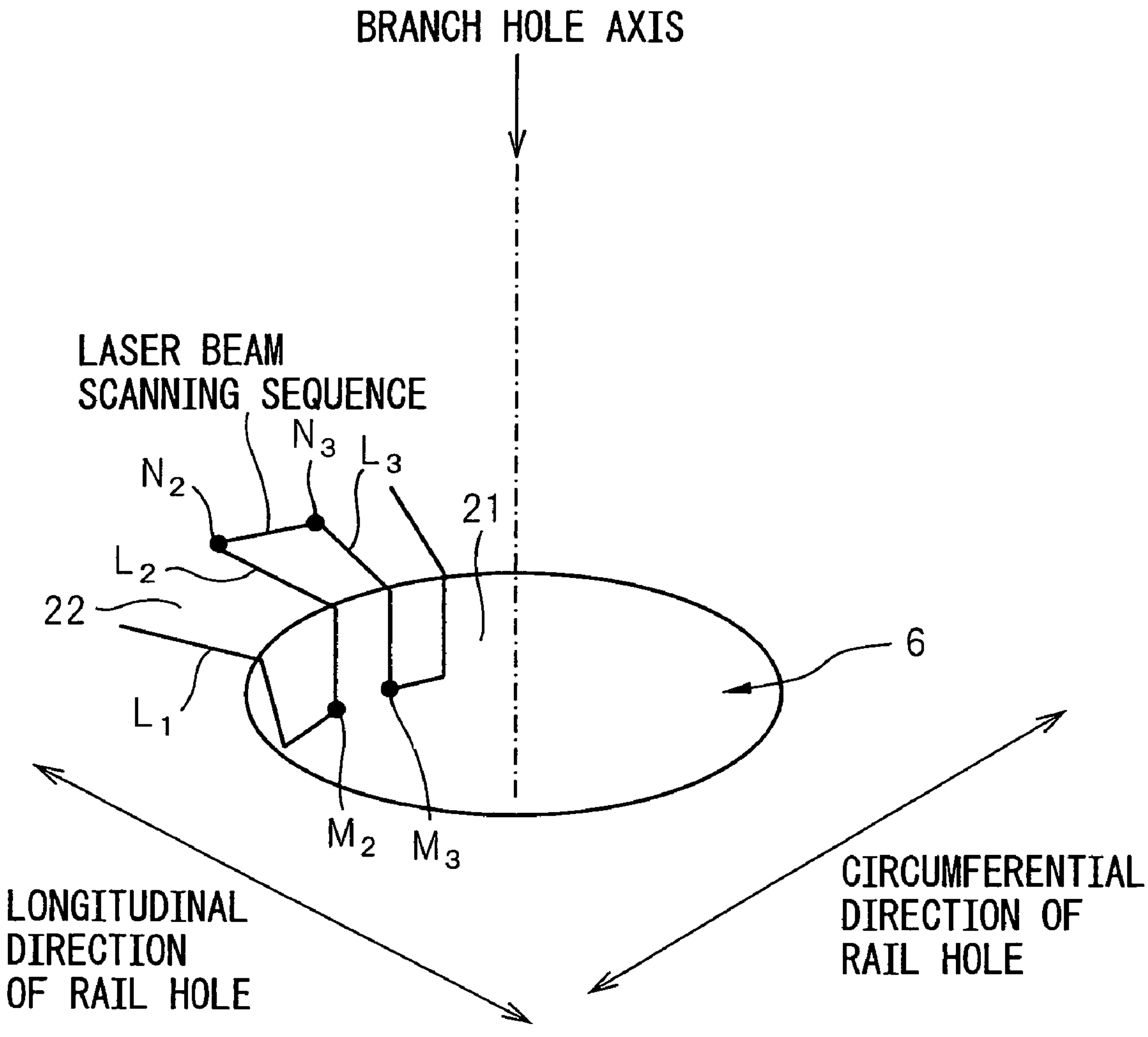
FIG. 15 is an explanatory diagram showing a laser beam irradiation method for irradiating a branch hole opening peripheral zone.
Figure 16:
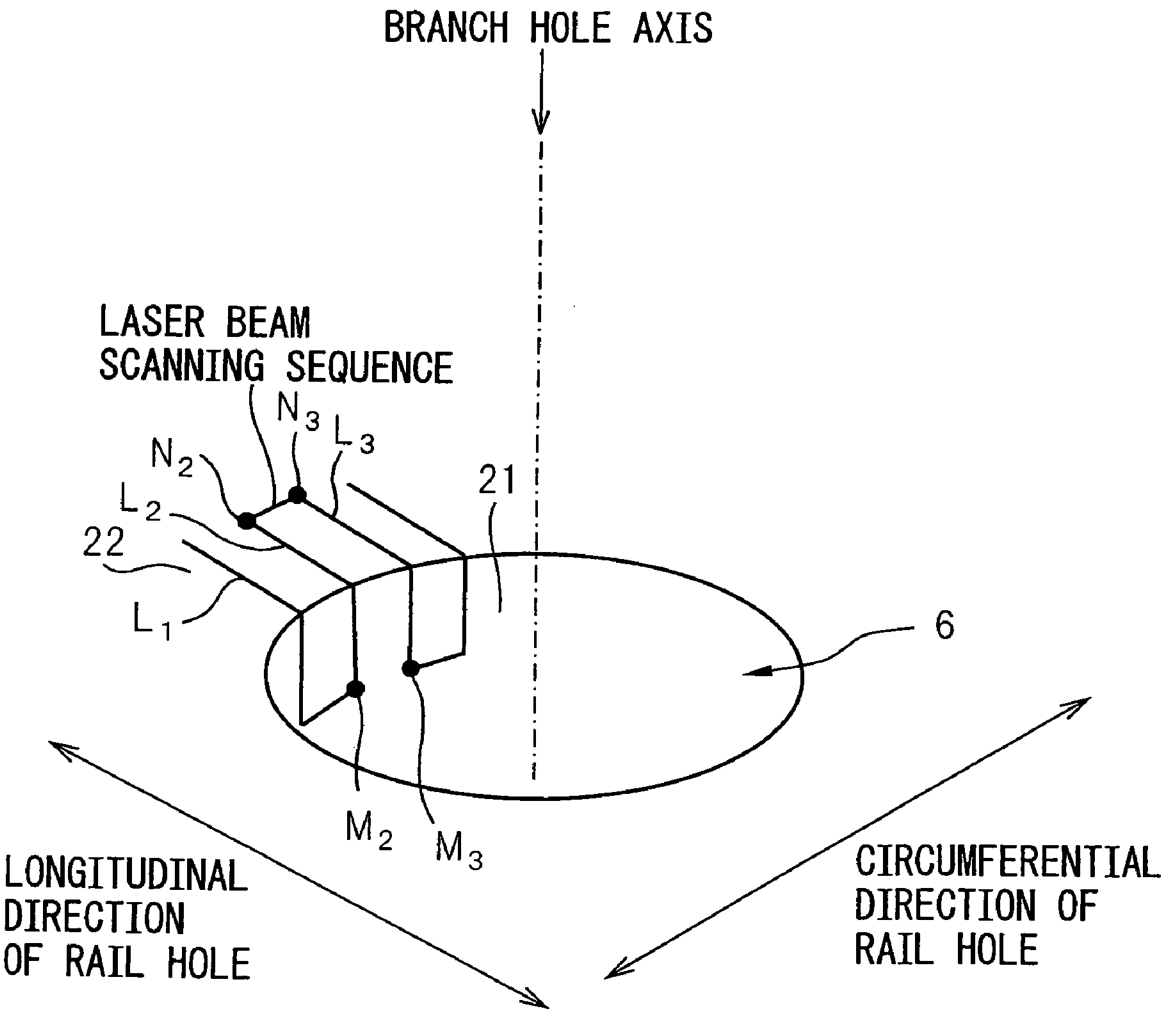
FIG. 16 is an explanatory diagram showing another laser beam irradiation method for irradiating in a branch hole opening peripheral zone.

Further, in order to maximize fatigue strength, the compressive stress in the circumferential direction of the rail hole 5, which is the principal stress direction of the portion where repeated load stress is largest during use, must be maximized. A method of laser-beam spot superimposition effective for this purpose is shown in FIG. 15. Thus, the beam spot is scanned within a plane including the central axis of the branch hole 6, and the beam spot scanning is conducted multiple times while shifting the position thereof in the circumferential direction of the branch hole 6. This method makes use of the fact that, if the processing is conducted by the method shown in FIG. 10, stress is selectively strengthened in the Y direction of FIG. 10, as shown in FIG. 7. It is worth noting that scanning direction need not be limited to within a plane including the axis of the branch hole 6. For example, the same effect can be obtained by, as shown in FIG. 16, scanning within a plane including the longitudinal direction of the rail hole 5 and the longitudinal direction of the branch hole 6 and scanning the beam spot multiple times while shifting the scanning in the circumferential direction of the rail hole 5.

Moreover, when steel is removed for the purpose of eliminating surface layer where stress was shifted toward the tensile side by melting and resolidification owing to the laser-beam irradiation, it is also preferable in this case to include the region represented by Formula (1).

Figure 12:
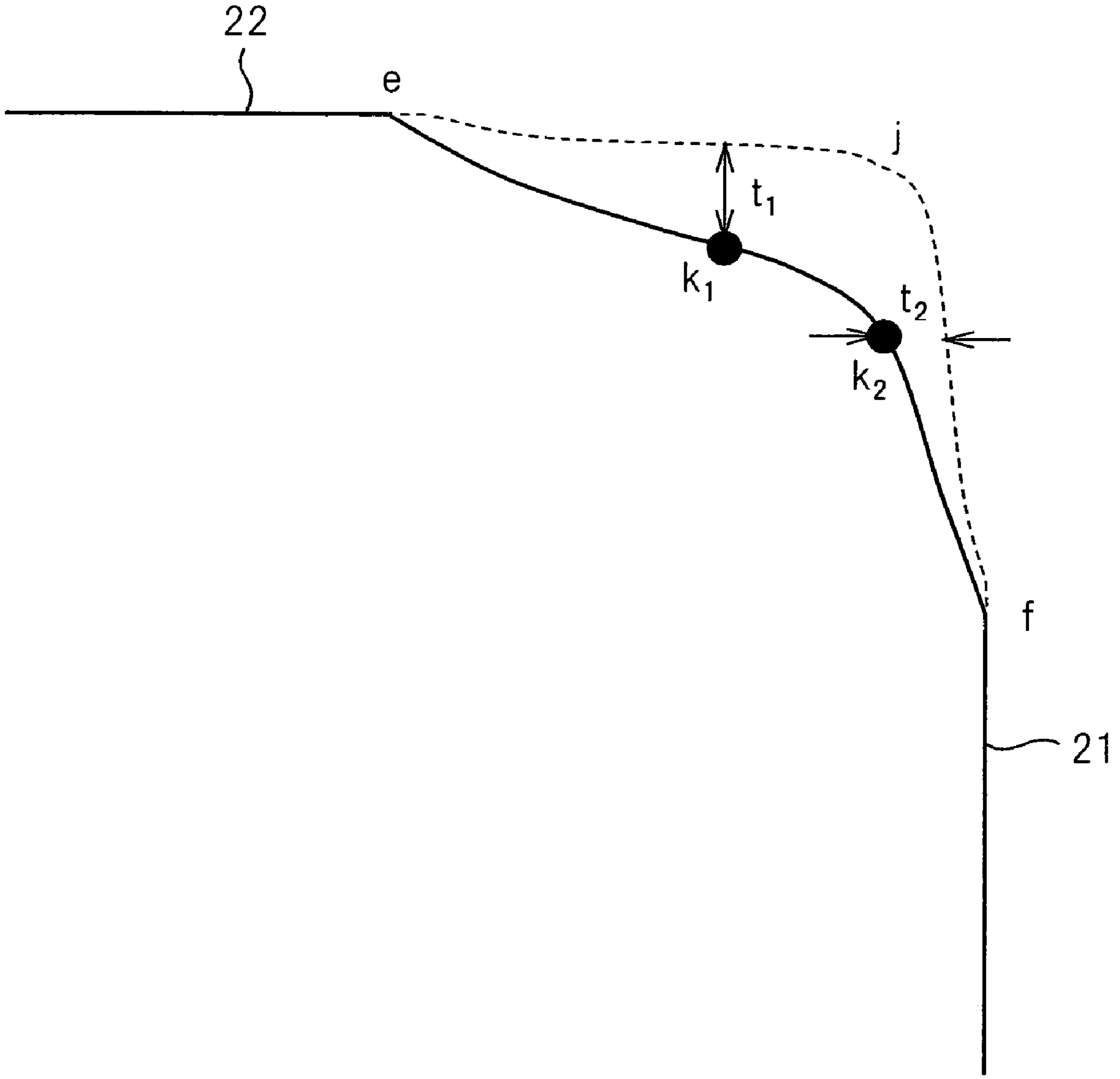
FIG. 12 is a cross-sectional view showing the state of a branch hole opening peripheral zone before and after removal of surface layer steel.

Next, the thickness of steel removal in the removal process will be considered. As set out in the following, the invention defines removal thickness with respect to points on the surface after removal. To define the removal thickness for a given point on the surface after removal, the point on the surface before removal whose distance from the given point on the surface after removal is smallest is found and that distance is defined as the removal thickness. Explanation will be made taking the branch hole cross-sectional view of FIG. 12 as an example. In the drawing, the broken line curve ejf is the line before removal, and the curve from through $k_1$ and $k_2$ to f is the line after removal. By the forgoing definition, the removal thickness at the line $k_1$ point after removal is indicated as $t_1$, and the removal thickness at the $k_2$ point is indicated as $t_2$. Although the explanation was made using a two-dimensional cross-section as an example, the actual removal thickness is defined by viewing the before/after removal lines considered in FIG. 12 as planes in three-dimensional space.

It is effective to control the removal thickness within the laser-peened region to fall within the following range. First, in order to remove surface layer whose stress was shifted toward the tensile side by melting and resolidification owing to laser-beam irradiation, the removal thickness at points of the surface after removal is controlled to 0.01 mm or greater. On the other hand, as shown in FIG. 7, compressive stress introduced by laser-peening tends to diminish with increasing depth from the surface. For example, from the depth distribution of Y direction stress in FIG. 7, it can be expected that removing steel to a depth from the surface of around 0.1 mm or so will actually cause the stress of the surface after removal to become smaller than that before removal. The attenuation of compressive stress in the depth direction can be mitigated by increasing the pulse energy. (The data of FIG. 7. was obtained at a pulse energy of 200 J.) Although a large removal thickness can be achieved by increasing pulse energy, keeping the removal thickness to around 0.3 mm or less is effective.

Steel removal not only is effective for eliminating surface layer whose stress was shifted toward the tensile side by melting and resolidification owing to laser-beam irradiation but also is effective for relaxing stress concentration factor by changing the opening periphery shape. For fatigue strength improvement, the surface after removal must be smooth so as to avoid concentration of stress at the portion where the tensile stress of the branch hole opening peripheral zone becomes greatest under fluctuating internal pressure load during use. From this viewpoint, the radius of curvature of the shape line at the opening peripheral zone of the branch hole viewed in a cross-section extending in the longitudinal direction of the rail hole and including the center line of the branch hole is preferably 15 μm or greater at points of the region satisfying Formula (2):

$$\text{Diameter of branch hole}\times 0.5 \leqq \text{Distance from center of branch hole} \leqq \text{Diameter of branch hole}\times 0.6 \qquad \text{Formula (2).}$$

Figure 21:
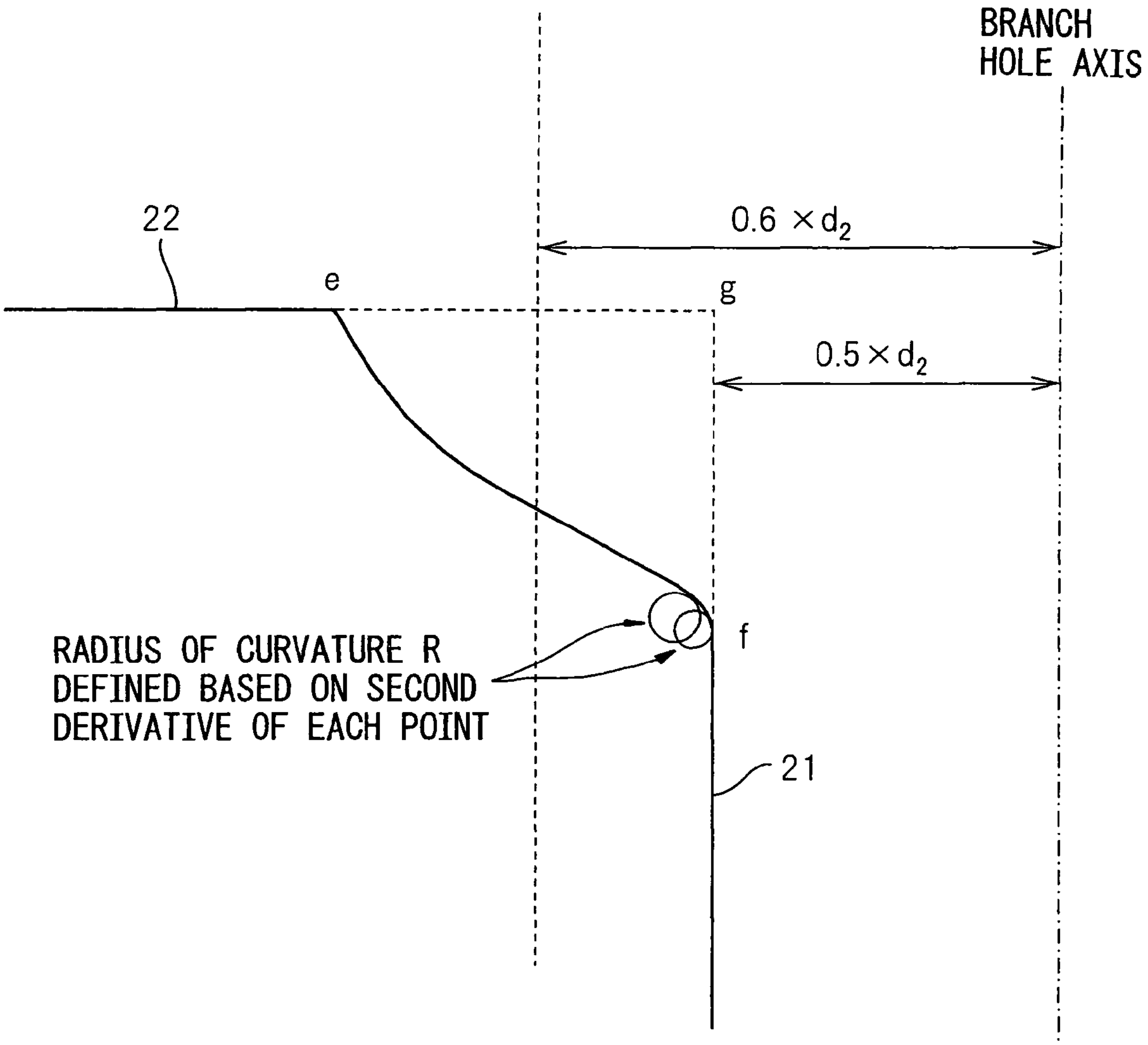
FIG. 21 is shows the cross-sectional shape of a branch hole opening peripheral zone.

This curvature definition is illustrated in FIG. 21.

In the foregoing was explained a method in which laser-beam irradiation is conducted solely from the inner surface 22 of the rail hole 5 in FIG. 4. However, it is also effective for increasing fatigue strength to conduct laser-beam irradiation both from the inner wall 21 of the branch hole 6 (diameter: $d_2$) and from the inner surface 22 of the rail hole 5. The reason for this will be explained. As shown in FIG. 7, the absolute value of the compressive stress imparted by laser-peening decreases with increasing depth. Therefore, when only the inner surface 22 of the rail hole 5 is laser-peened, the absolute value of the compressive stress at portions farther from the inner surface 22 of the rail hole 5, e.g., $g_2$ point in FIG. 4, sometimes becomes smaller than that at the surface layer. On the other hand, after removal of steel of the opening peripheral zone, the repeated load stress during actual use usually becomes greatest in the vicinity of this $g_2$ point. When laser-peening is conducted both from the inner wall 21 of the branch hole 6 and from the inner surface 22 of the rail hole 5, the total compressive stress introduced is the sum of that introduced from the individual walls. The absolute compressive stress at the $g_2$ point can therefore be raised to achieve higher fatigue strength.

When the inner wall 21 of the branch hole 6 is also laser-peened, the depth h of the processing range is adequate if set at around 20% of the rail hole diameter $d_1$, where height is measured with reference to the circle formed by the intersection of the rail hole inner surface 22 and the branch hole inner wall 21. In order to process deep portions of the branch hole inner wall 21, the incidence angle of the laser beam on the branch hole inner wall 21 must be made large. For a laser beam of any given peak power, the peak power density at the irradiation spot decreases with increasing incidence angle. As a result, when the diameter $d_2$ is small, the depth h is usually governed by the limit to which irradiation is possible at a suitable peak power density.

On the other hand, the method of conducting laser beam irradiation solely from the inner surface 22 of the rail hole 5 has the advantage of enabling use of simple equipment because no mirror tilting mechanism is required for processing the inner wall 21 of the branch hole 6.

Figure 13:
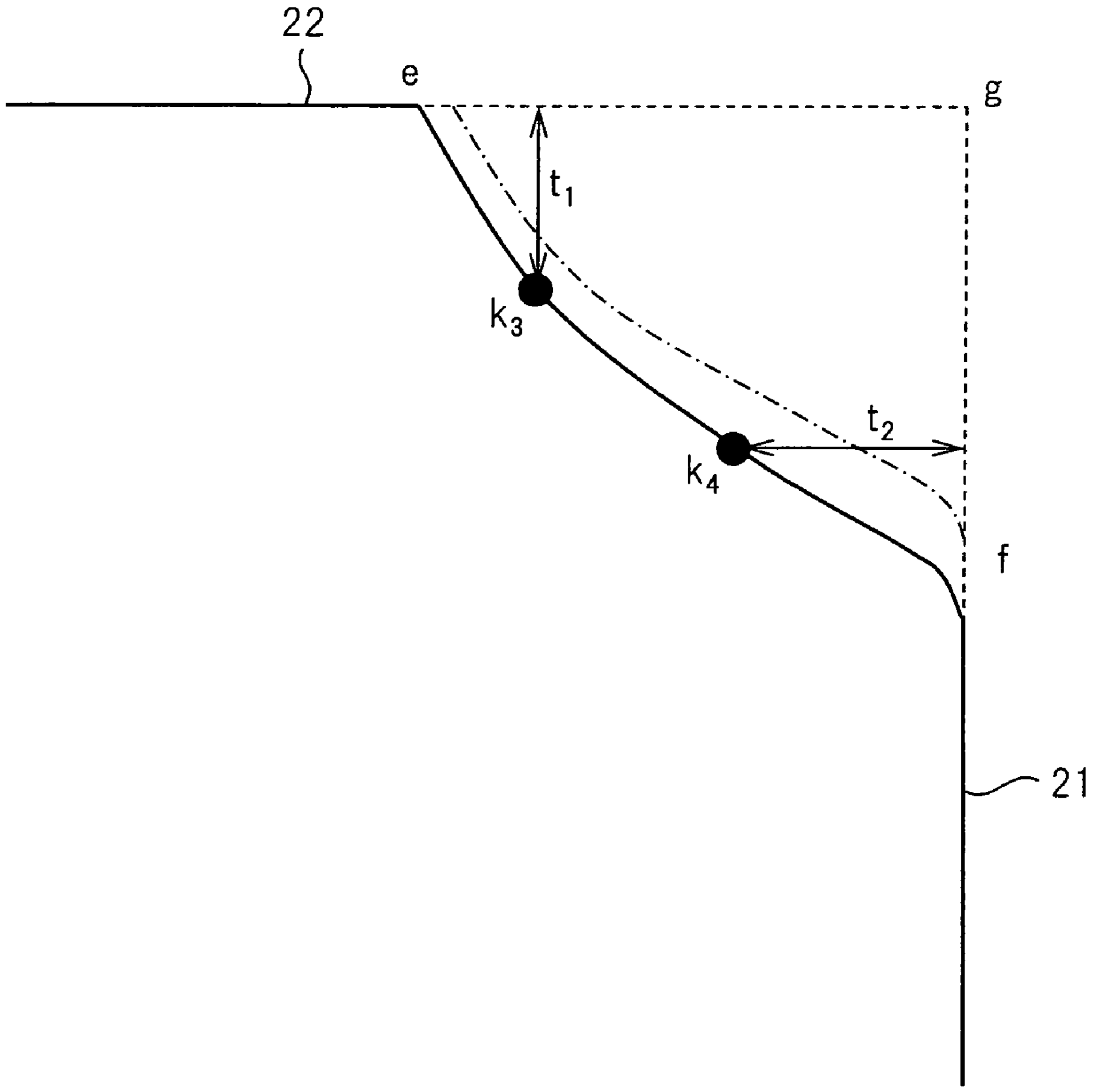
FIG. 13 is a cross-sectional view showing a branch hole opening peripheral zone after removal of surface layer steel in the case where the peripheral zone is chamfered.
Figure 14:
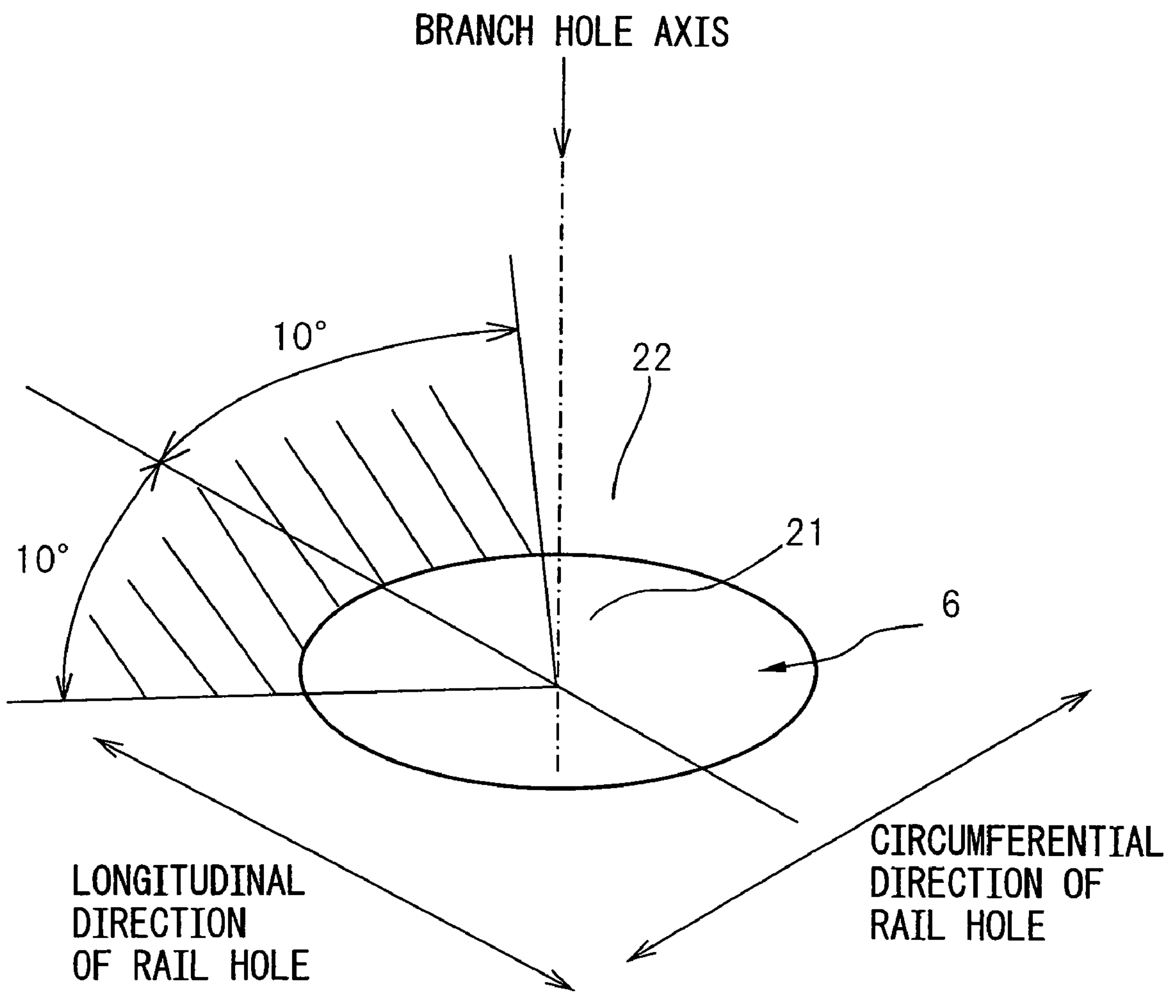
FIG. 14 is an explanatory diagram showing the angle range of a laser-beam irradiated region of a branch hole opening peripheral zone.

In another embodiment of the present invention, after the branch holes 6 have been formed, the opening peripheral zone of each is chamfered to a predetermined degree by polishing or machining. The opening peripheral zone is then laser peened and steel is removed from the laser-peened opening peripheral zone to obtain a common rail with enhanced opening peripheral zone strength. This is mainly for the purpose of mitigating the stress concentration factor and is particularly effective in the case where the product design calls for considerable thickness removal between the time the branch hole 6 is formed and the time it reaches its final processed shape. FIG. 13 is a schematic diagram illustrating an example of implementing this embodiment. The corner egf indicated by the dashed line in the drawing indicates the cross-sectional shape at the time of hole formation, the chain line indicates the cross-sectional shape after chamfering, and the solid line extending from e through $k_3$ and $k_4$ to f indicates the final processed cross-sectional shape obtained after laser-peening and steel removal have been conducted. Considering a case where the removal thicknesses between the time of hole formation and the time when the final processed shape is reached, as exemplified by the thicknesses $t_1$ and $t_2$ shown in the drawing, exceed 0.3 mm. When the aforesaid first embodiment is applied, laser-peening is conducted from the surface of the corner egf indicated by the dashed line in the drawing and the final processed shape (curve $ek_3k_4f$ in FIG. 13) is thereafter obtained by removal of steel. Since the steel removal thickness exceeds 0.3 mm in this case, the residual compressive stress at the surface of the final processed shaped obtained after steel removal becomes small, as was pointed out earlier. In contrast, when the second embodiment is utilized, laser-peening is conducted after chamfering to the cross-sectional shape indicated by the chain line in FIG. 13. As a result, the steel removal thickness following laser-peening is small. This has the advantage of enabling large compressive stress to be obtained at the surface of the final processed shape (curve $ek_3k_4f$ in FIG. 13).

Chamfering conducted before laser-peening is done for the purpose of mitigating the stress concentration factor of tensile stress acting on the branch hole opening peripheral zone in the course of fluctuating internal pressure load during actual use. It is therefore effective to conduct the chamfering to include the region near where this stress is maximum, i.e., the region represented by the aforesaid Formula (1). Although the chamfering mitigates stress concentration at the branch hole 6 opening peripheral zone, the maximum value of the stress distribution remains in the vicinity of a region of the longitudinal cross-section of the rail hole 5 including the central axis of the branch hole 6 that is near the connection region between branch hole inner surface and the surface subjected to removal processing. Therefore, the region where the branch hole opening periphery is thereafter laser-peened and the region from which steel is removed for the purpose of eliminating surface layer where stress was shifted toward the tensile side by melting and resolidification owing to the laser-beam irradiation are also preferably selected to include the region represented by Formula (1).

The thickness removed at the laser-peened region is preferably controlled to between 0.01 mm and 0.3 mm. From the viewpoint of minimizing reduction of compressive stress of the surface from which steel was removed, it is advantageous to perform the chamfering conducted prior to laser-peening to near the final processed shape because this enables the removal thickness after the laser-peening to be held to a small value of 0.1 mm or less, which is the particularly preferable range.

Common rails are usually made of high-strength steel. The transparent liquid provided at the laser-beam irradiated surface is therefore preferably one that does not promote rusting, such as alcohol (methyl or ethyl alcohol) or the like. Alternatively, the invention can be preferably implemented without common rail rusting by using a liquid prepared by adding methyl alcohol and ethyl alcohol to water in desired proportions or by adding a rust inhibitor to pure water, tap water or mineral water. A commercially available rust inhibitor can be used. If a colored inhibitor is used, the density of the inhibitor should be adjusted in the range where laser beam can penetrate in water colored by the inhibitor. Thus steel members having 600 MPa class strength are assembled using the low-cost liquid phase diffusion bonding process and the assembly is subjected to laser-peening around the branch holes where the maximum principal stress is applied under internal pressure load, thereby totally eliminating the fatigue fracture which originates from inclusions that are unavoidable in a high-strength steel. As a result, it has become possible for the first time to provide an inexpensive common rail capable of withstanding ultrahigh pressures of 2,000 atm or greater with capacity to spare. This is the most salient feature of the present invention.

In the present invention, the steel according to the first aspect may, as set out with regard to the second to fourth aspects, contain one or more of Ni: 0.01 to 9.0%, Co: 0.01 to 5.0%, Cu: 0.01 to 5.0%, and W: 0.01 to 2.0%, one or more of Zr: 0.001 to 0.05%, Nb: 0.001 to 0.05%, Ta: 0.001 to 0.2%, and Hf: 0.001 to 0.2%. and one or more sulfide shape control elements selected from among Ca: 0.0005 to 0.005%, Mg: 0.0005 to 0.005%, Ba: 0.0005 to 0.005% and the like, and rare earth elements selected from among Y: 0.001 to 0.05%, Ce: 0.001 to 0.05%, La: 0.001 to 0.05% and the like.

The addition ranges of these alloying components are limited for the following reasons. Ni, Co and Cu are all $\gamma$ stabilizing elements and are elements that improve hardenability by lowering the steel transformation point and thus promoting low-temperature transformation. They are useful elements for improving HTL value and each exhibits its effect when added to a content of 0.01% or greater. Addition of Ni in excess of 9.0% or either of Co and Cu in excess of 5.0% increases residual $\gamma$, which affects steel toughness. The addition ranges are therefore defined as 0.01 to 9.0% for Ni and 0.01 to 5.0% for each of Co and Cu. As all three elements are expensive, their contents are preferably controlled to Ni: 0.01 to 5.0%, Co and Cu: 0.01 to 1.0% from the viewpoint of industrial production.

W is an $\alpha$ stabilizing compound but this effect is observed at a content of 0.01% or above. When W is added in excess of 2%, it degrades joint toughness by forming boride and phosphide with B and P, which are liquid phase diffusion bonding diffusion elements. The upper limit of addition is therefore defined as 2.0%. However, taking grain boundary segregation into consideration, the upper addition limit is preferable defined as 1.0%.

Zr, Nb, Ta and Hf precipitate finely as carbides, thereby increasing the strength of the steel. Each exhibits this effect at a content of 0.001% or above. When either Zr or Nb is added to a content of 0.05% or either Ta or Hf is added to a content of 0.2%, carbide coarsening degrades toughness. These values are therefore defined as the upper limits of addition. When formation of boride or phosphide at the grain boundaries is especially objectionable, the upper limits of element addition are preferably 0.035% for Nb and Zr and 0.1% for Ta and Hf.

Moreover, all of Ca, Mg, Ba and other sulfide shape control elements, and Y, Ce, La and other rare earth elements have high affinity for S present in the steel as impurity. As such, they are effective for inhibiting formation of MnS, which affects steel toughness. Therefore, these elements need to be added to the concentrations at which they exhibit their effect, namely, to a content of 0.0005% in the case of Ca, Mg and Ba, while Y, Ce and La must be added to a content of 0.001% because of their large atomic weights. When Ca, Mg and Ba are added in excess of 0.005%, they form coarse oxides that reduce toughness, and when Y, Ce and La are added to a content of 0.05%, they also form coarse oxides. The upper limit of addition of these elements is therefore defined as 0.05%.

The elements of the groups can either be appropriately combined and added jointly or be added independently to impart various properties to the steel without impairing the effects of the present invention.

The process for producing the invention steel is not limited to the ordinary integrated steelmaking process by the blast furnace—converter route and it is instead possible to apply the electric furnace method using a cold-iron resource or the converter production method. Moreover, production need not go through the continuous casting process route but can be conducted via the ordinary casting and forging process route. It suffices to satisfy the chemical component ranges and formulas set out in the claims and it is possible to apply an expanded range of production methods with respect to the invention technology. The shape of the produced steel is arbitrary and necessary molding technologies can be implemented to shape the adopted members. In other words, it is possible to apply the effect of the invention technology broadly to steel plates, steel pipes, steel bars, wire rods, steel shapes and the like. Furthermore, since the steel of this invention is excellent in weldability and suitable for liquid phase diffusion bonding, it can be applied with no loss of the invention effects to fabricate a structure that includes a liquid phase diffusion bonded joint and is partially welded or used in combination with a welded structure.

EXAMPLE

In the following, an explanation is made with regard to the prototyping of a common rail for verifying the invention effects and to the results of internal pressure fatigue testing conducted.

Figure 17:
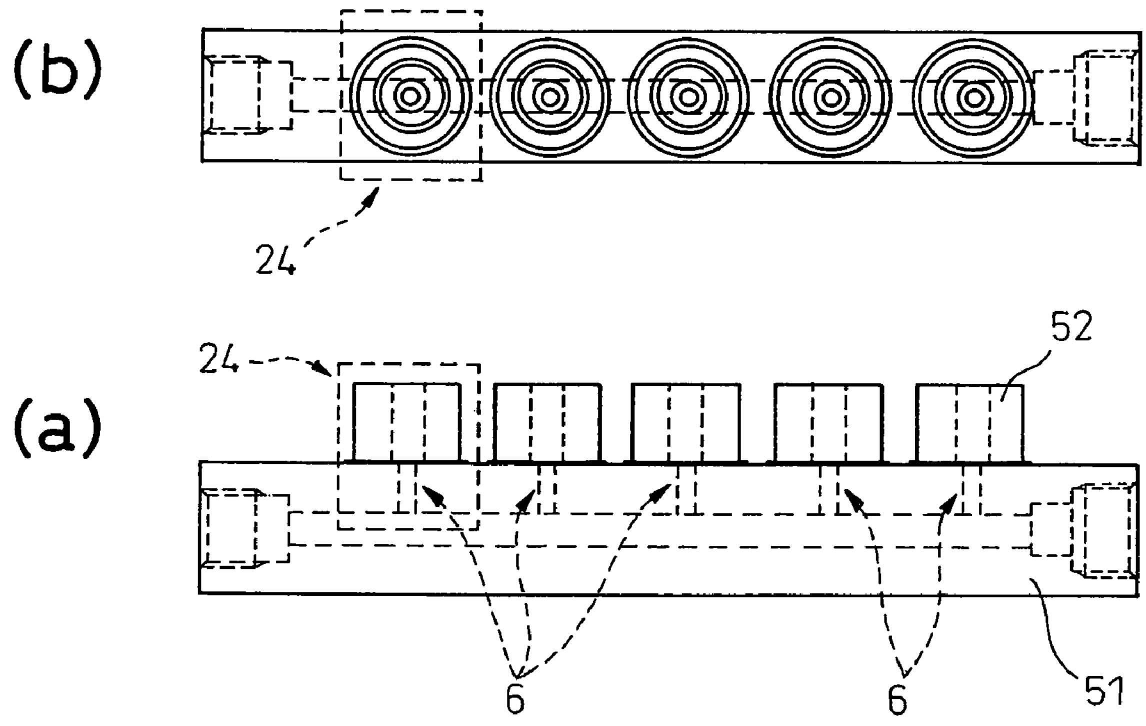
FIG. 17 is a set of plan views showing a test piece.

Common rails like that illustrated in FIG. 17 were each fabricated as follows. First, a common rail body 51 measuring 230 mm in length, 40 mm in width and 30 mm in thickness and holders 52 measuring 25 mm in height, 24 mm in outside diameter and 4 mm in thickness were fabricated. Utilizing laboratory scale vacuum-melting or practical steel plate production equipment, a steel of a chemical composition falling in the range of one of the first to fourth aspects of the present invention was produced in an amount of 100 kg to 300 ton by vacuum melting or ordinary blast furnace—converter—secondary refinement—degassing/trace element addition—continuous casting—hot rolling. The steel was processed and shaped into the form shown in FIG. 17. Next, the rail body was formed with 1) a 10 mm-diameter rail pipe extending through the center of the rail body in the longitudinal direction, 2) guide grooves measuring 4 mm in depth and 7 mm in width for defining holder bonding locations, and 3) 1 mm-diameter branch holes 6 ($d_2$=1.0 mm) directed toward the rail pipe at locations for holder bonding so that they would come to lie along extensions of the holder axes. The holders were formed on their inner walls with 2 mm high threads for fastening branch lines for fuel distribution. Next, the end faces of the bonding regions of the rail body and each holder were ground to Rmax<100 μm (measurement length: 9 mm) and degreased. The end face pairs were abutted to form a bonding test piece. In a tension-compression testing machine equipped with a 150 kW output high-frequency induction heating unit, a 25 μm thick amorphous foil composed of, in mass %, Ni: 47.0%, B: 14.0%, C, 2.0% and the balance of Fe and unavoidable impurities, at least 50% by volume of which was amorphous, was interposed between each pair of bonding faces. The entire test piece was heated to a bonding temperature of 1,080° C. and liquid phase diffusion bonded under stress of 2 MPa for 10 min, followed by spontaneous cooling.

Figure 18:
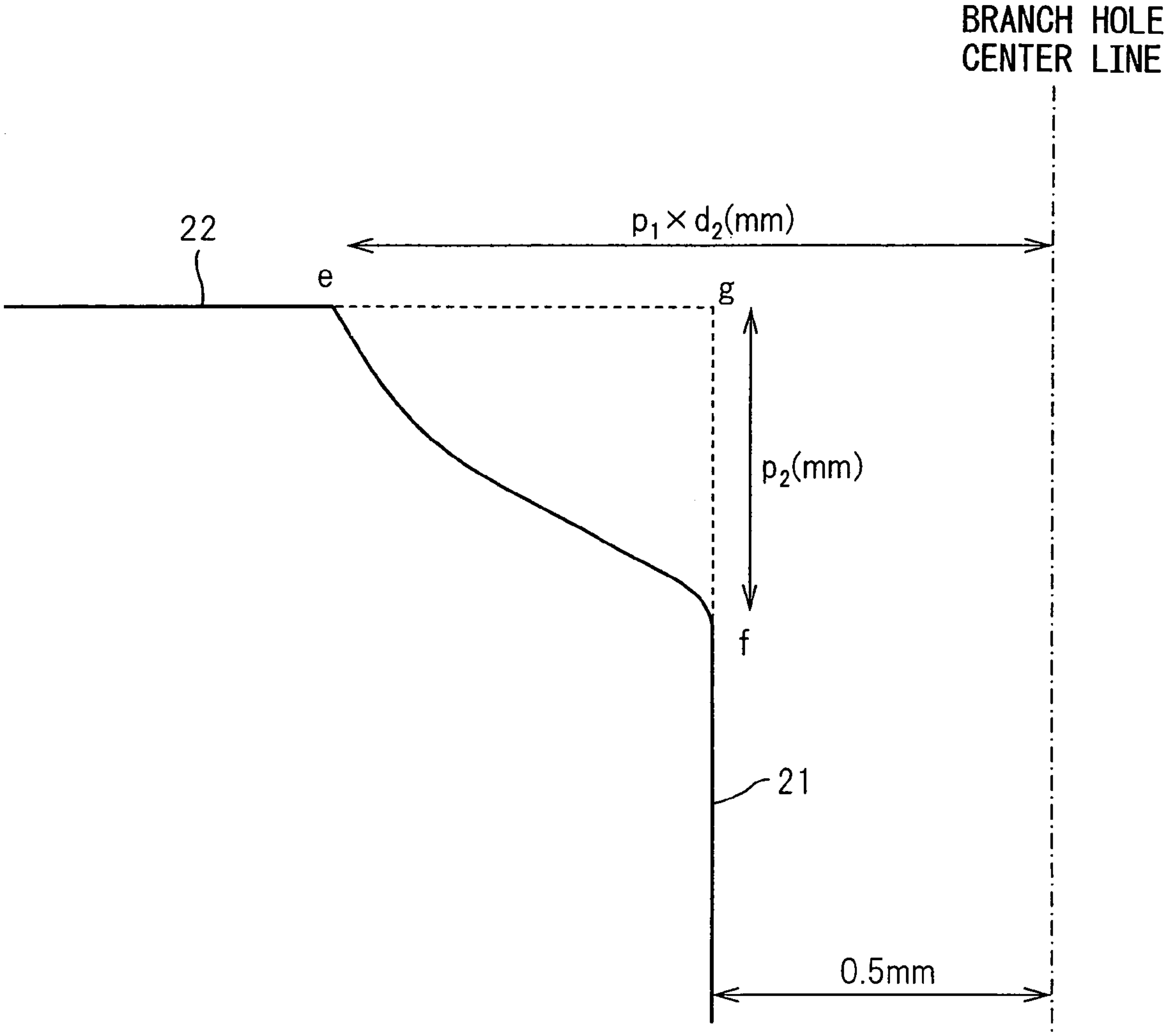
FIG. 18 is a cross-sectional view showing chamfer processing applied to a branch hole opening peripheral zone.

In some instances, the laser-peening explained below was preceded by chamfering of the edges of the rail pipe side ends of the branch holes 6 of the rail body 51. The chamfering was performed by applying electric current through a spherical projection operated under pressure to polish in a concentric shape centered on the axis of the branch hole 6. The diameter of the projection and the electrolytic polishing time were varied to vary the width $p_1$ and depth $p_2$ of the chamfered region as shown in FIG. 18.

Figure 22:
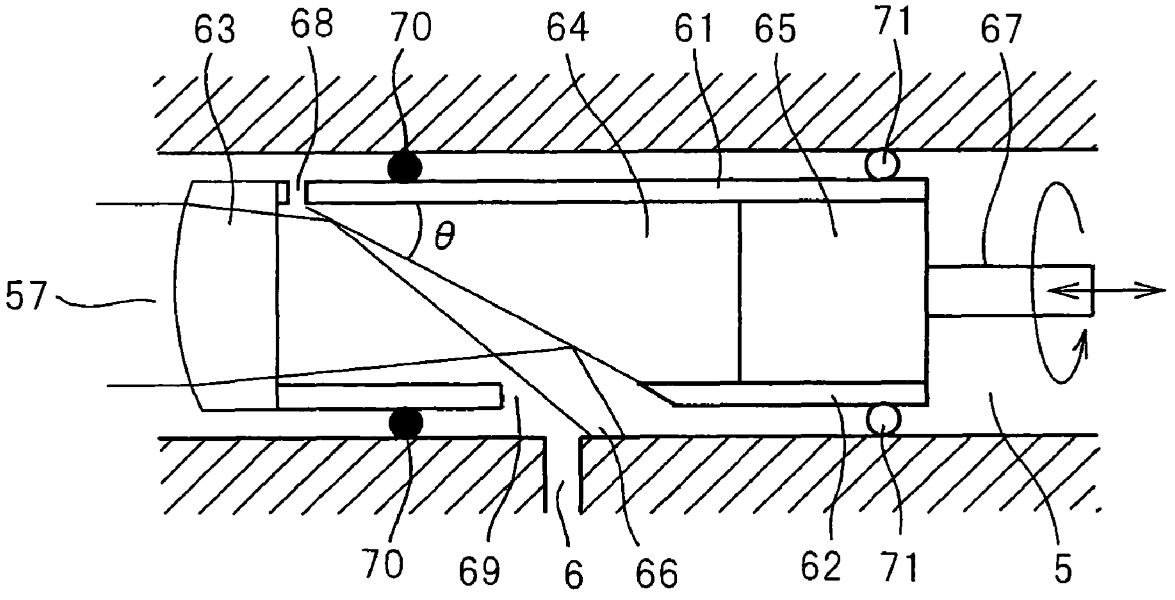
FIG. 22 is a cross-sectional view showing the irradiation head unit of a laser beam-processing system.

The laser-peening was conducted with respect to the peripheral zone of the branch hole 6 opening on the rail pipe side. FIG. 22 shows an irradiation head unit 61, which is the laser-beam processing apparatus used for the laser-peening, and the manner in which the unit was inserted into the rail hole 5. The irradiation head unit 61 is equipped with a focusing lens 63 and a mirror 64 mounted in a pipe 52. In the configuration shown in FIG. 22, the mirror 64 is a rod mirror having the shape of a cylinder cut diagonally. It is adhered to a mirror seat 65. A laser beam 57 directed into the rail hole 5 of the common rail 1 is bent by the focusing lens 63, reflected by the mirror 64, and advances to a focused spot 66. Since water is present on both sides of the condenser lens 63, the lens material is preferably one having a high refractive index to ensure adequate beam bending. The material should also be durable against a laser beam having high peak power density. Sapphire is used in this example. In order to prevent the mirror 64 from being contaminated by metal particles and plasma emanating from the laser beam irradiation spot, the pipe 62 is formed with a pair of cut-outs 68, 69, and a ring-shaped seal member 70 is provided to encircle the pipe 62. This arrangement functions to protect the surface of the mirror 64 by establishing within the pipe 62 a water current passing from one cut-out 68 to the other cut-out 69. As the laser beam was selected the second harmonic wave of an Nd: YAG laser (wavelength: 532 nm) or the second harmonic wave of an Nd: $YV0_4$ laser (wavelength: 532 nm), because these beams have good water penetrating power. The pulse durations of the pulsed laser beams were 10 ns and 1 ns, respectively. The laser-beam processing was conducted while varying the pulse energy and the spot diameter. The Nd: YAG laser was used for processing conducted at a pulse energy of 10 mJ or greater and the Nd: $YV0_4$ laser was used for processing conducted at a pulse energy of less than 10 mJ. The spot at the irradiation point was substantially circular and the peak power density was controlled to 50 TW/$m^2$.

In order to increase compressive stress in the rail hole circumferential direction the beam spot was, as shown in FIG. 15, scanned within a plane including the axis of the branch hole 6 and multiple scans were conducted while shifting the scanned beam spot in the peripheral direction of the branch hole 6. The laser-beam processed region was the region represented by Formula (3) and the processing was conducted while changing $p_3$ and $p_4$. The definitions of $p_3$ and $p_4$, and the processed region, are indicated by the slanted lines in FIG. 19.

Distance from center of branch hole≦Diameter of branch hole ($d_2$)×$p_3$

Angle between line segment drawn to branch hole center and longitudinal direction of rail hole≦$p_4$° Formula (3).

Figure 19:
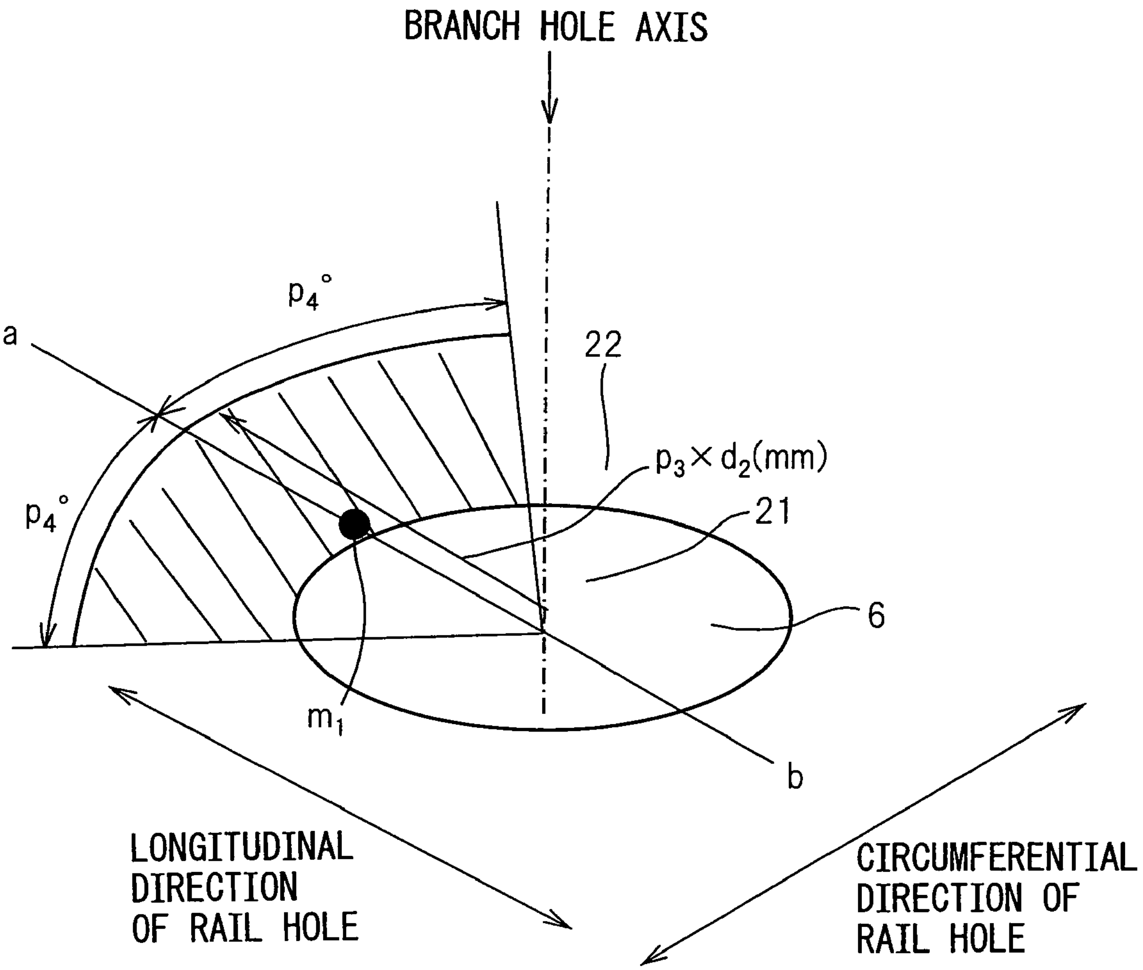
FIG. 19 is a perspective view showing the portion of a branch hole opening peripheral zone to be treated with a laser beam.

The average number of times that a given spot was irradiated with the pulsed laser beam was controlled to 6.9. In FIG. 19, the processed region on the side of "a" shown in the figure is only indicated for simplicity. In actual processing, the side of "b" in the figure was also processed in the same manner as the "a" side.

Figure 20:
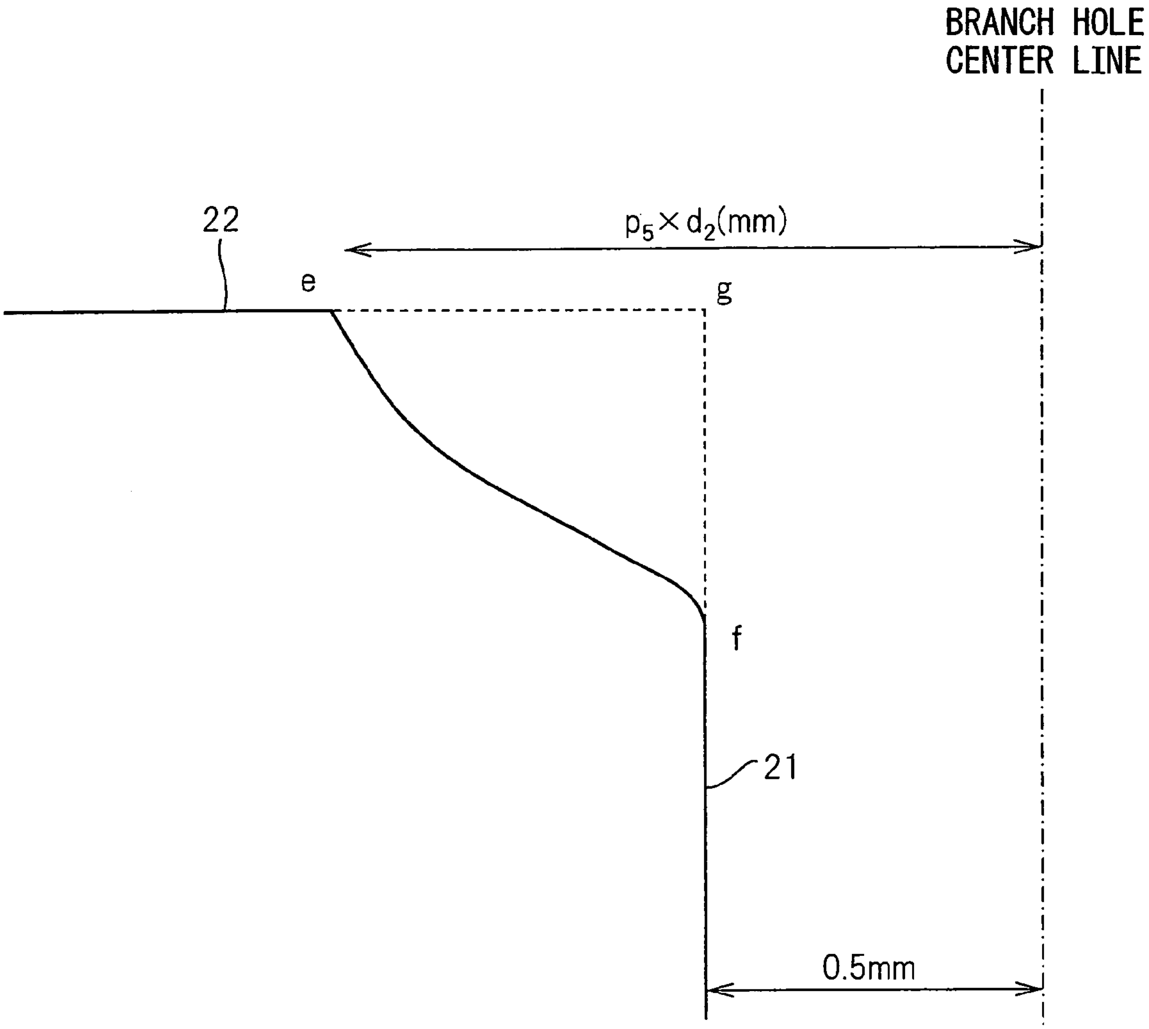
FIG. 20 is a cross-sectional view showing electrolytic polishing applied to a branch hole opening peripheral zone.

After laser-peening, steel was removed by electrolytic polishing. Electric current was applied through a spherical projection operated under pressure to polish in a concentric shape centered on the axis of the branch hole 6. The diameter of the projection and the electrolytic polishing time were varied to vary the width $p_5$, as shown in FIG. 20, and removal depth $p_6$ of the electrolytic polished region. The removal depth was defined as set out above. The maximum radius of curvature Rm of the branch hole shape line at the region satisfying the foregoing Formula (2) in the longitudinal cross-section of the rail hole including the axis of the branch hole ($d_2$=1.0 mm) was evaluated. The parameters ($p_1$, $p_2$, $p_5$, $p_6$) related to the opening region shape after electrolytic polishing in the embodiment explained above were measured by cutting common rails not subjected to fatigue testing to obtain the cross-section including the longitudinal direction of the rail hole and the axis of the branch hole, polishing the cut surfaces, and observing their shapes with an optical microscope.

Each common rail fabricated by the aforesaid method was set in an internal pressure fatigue tester by means of an additional fabricated fastening jig attached to the tester. The internal pressure test was conducted at a maximum injection pressure of 300 MPa, 15 Hz, and 10 million cycles. In the test, screws were selected for blocking the open ends of the holders that mated with the shapes of the threads formed on the inner walls of the holders and were driven in using a maximum torque of 3 ton to simulate the use environment of an actual engine. Table 1 shows the fatigue test results. The numerals indicating steel composition conditions correspond to the conditions set out in Table 2. The measured residual stress $\sigma_A$ in the rail hole circumferential direction at point $m_1$ in FIG. 19 is shown in Table 1. For the residual stress $\sigma_A$ measurement, a portion 24 including one branch hole was cut from each common rail not subjected to the fatigue testing, as shown in FIG. 17, and analysis was conducted using an x-ray residual stress analyzer. In order to extract the specimen without changing the residual stress introduced by the laser-peening, the cutting was performed at locations apart from the rail hole side opening of the branch hole. The length of the cut was 40 mm in the longitudinal direction of the rail hole and the cutting was done also in a plane perpendicular to the branch hole axis and including the rail hole axis. The x-ray stress measurement beam diameter was 0.1 mm.

Set of Conditions 126 is a prior art example in which laser-peening was conducted but no polishing was performed thereafter. Sets of Conditions 106, 108, 111, 114, 116 and 119 are comparative examples in which polishing was conducted after laser-peening but no significant effect over the prior art example was observed owing to the conditions being unsuitable. The remaining sets of conditions are invention examples. Under every set of invention conditions, an improvement in fatigue strength over the prior art example was observed.

Set of Conditions 106 is an example in which the fatigue strength improving effect was small because the pulse energy was deficient so that depth of compressive stress by the laser-peening was shallow and $\sigma_A$ following electrolytic polishing was therefore small. On the other hand, sets of Conditions 101 to 105, in which the pulse energy was 1 mJ or greater, all produced improvements in fatigue strength.

Sets of Conditions 108 and 111 are examples in which the fatigue strength improving effect was small because the laser-beam processing region was too small so that the effect of reducing tensile stress in the region of large load during internal pressure fatigue testing was insufficient. On the other hand, sets of Conditions 107, 109 and 110, whose laser pulse energy conditions were the same as those of sets of Conditions 108 and 111 and in which $p_3 \geqq 0.6$ and $p_4 \geqq 10°$, all exhibited fatigue strength improving effect.

Set of Conditions 114 is an example in which the fatigue strength improving effect was small because the electrolytic polishing was too small so that the effect of reducing stress concentration factor in the region of large load during internal pressure fatigue testing was insufficient. It is noted that even though electrolytic polishing was conducted, Rm was not much different from that of set of Conditions 126, a prior art example. On the other hand, sets of Conditions 103, 112 and 113, whose laser pulse energy conditions were the same as those of set of Conditions 114 and in which $p_5 \geqq 0.6$, all exhibited fatigue strength improving effect.

Set of Conditions 116 is an example in which the fatigue strength improving effect was small because the electrolytic polishing thickness was, at 0.4 mm, too large so that the depth to which compressive stress was introduced by laser-peening was removed and $\sigma_A$ following electrolytic polishing was therefore small.

Set of Conditions 119 is an example in which the fatigue strength improving effect was small because the electrolytic polishing thickness was, at 0.005 mm, too small so that the effect of eliminating surface layer where stress was shifted toward the tensile side by melting and resolidification owing to the laser-beam irradiation was insufficient and, in addition, relaxation of stress concentration by the electrolytic polishing was also insufficient, so that neither Rm nor $\sigma_A$ differed substantially from those of set of Conditions 126, a prior art example.

The present invention enables a major improvement in fatigue strength over the prior art by achieving an effect of increasing surface compressive stress together with a synergistic complementary effect of relaxing stress concentration factor produced by shape modification. As can be seen from the test results, it is effective for realizing the invention effects to establish conditions of absolute value of $\sigma_A \geqq 200$ MPa and Rm$\geqq$15 μm.

Table 3 shows examples in which the steel itself or the liquid phase diffusion bonded joint failed to achieve resistance to internal pressure fatigue because the steel adopted deviated from the chemical compositions according to the first to fourth aspects of the invention so that the liquid phase diffusion bonded joint property of the steel was not achieved in the first place, thus making laser-peening meaningless. The laser-peening was in every instance conducted in accordance with the conditions of No. 122 in Table 1. Steel No. 51 is an example in which good liquid phase diffusion bonded joint toughness could not be secured because C content was excessive (the joint fatigue properties were inferior to those of the laser-peened branch hole opening region). Steels No. 52 and 53 are examples in which the joint fatigue properties were inferior to those of the laser-peened branch hole opening regions because the Si content of the Steel No 52 and the Mn content of Steel No. 53 were excessive, so that joint toughness was reduced by formation of abundant MnO—$SiO_2$ complex oxide at the liquid phase diffusion bonded joint. Steel No. 54 is an example in which excessive Cr content caused abundant occurrence of δ ferrite in the steel structure so that steel strength declined to make both the joint strength and the fatigue properties of the laser-peened branch hole opening region inferior. Steel No. 55 is an example in which the joint fatigue properties were inferior to those of the laser-peened branch hole opening regions because excessive Mo content degraded joint toughness by causing abundant occurrence of boride at the liquid phase diffusion bonded joint. Steel No. 56 is an example in which the joint fatigue properties were inferior to those of the laser-peened branch hole opening region because excessive V content degraded toughness by causing occurrence of coarse V carbide at the bonded joint. Steel No. 57 is an example in which the joint fatigue properties were inferior to those of the laser-peened branch hole opening region because excessive Ti addition degraded joint toughness by causing occurrence of abundant Ti-containing carbonitride at the joint. Steel No. 58 is an example in which the joint fatigue properties were inferior to those of the laser-peened branch hole opening region because excessive B addition degraded toughness by causing occurrence of B-containing carbides and borides at the joint. Steel No. 59, Steel No. 60 and Steel No. 61 are examples which had excessive Ni, Co and Cu addition, respectively, so that the joint fatigue properties were inferior to those of the laser-peened branch hole opening region owing to abundant occurrence of residual γ that degraded bonded joint toughness. Steel No. 62 is an example in which the joint fatigue properties were inferior to those of the laser-peened branch hole opening region because excess W addition degraded toughness by causing occurrence of abundant boride at the joint. Steel Nos. 63 to 66 are examples which had excessive Zr, Nb, Ta and Hf content, respectively, so that the joint fatigue properties were inferior to those of the laser-peened branch hole opening region owing to toughness degradation by abundant occurrence of the corresponding carbides at the bonded joints. Steel Nos. 67 to 69 are examples which had excessive Ca, Mg and Ba addition, respectively, so that the joint fatigue properties were inferior to those of the laser-peened branch hole opening region owing to bonded joint toughness degradation by occurrence of the corresponding oxides. Steel Nos. 70 to 72 are examples which had excessive Y, Ce and La addition, respectively, so that the joint fatigue properties were inferior to those of the laser-peened branch hole opening region owing to bonded joint toughness degradation by occurrence of the corresponding oxides. Steel No. 73 is an example in which the total addition of As+Sn+Sb+Pb+Zn exceeded 0.015% so that the joint fatigue properties were inferior to those of the laser-peened branch hole opening region owing to joint toughness degradation by grain boundary embrittlement. Steel No. 74 is an example in which the steel chemical composition was within the range of the present invention but the HTL value was lower than 8, so that the joint fatigue properties were inferior to those of the laser-peened branch hole opening region owing to degradation of both the strength and toughness of the joint.

TABLE 1

| Conditions | Steel No. | Chamfer conditions p1 | Chamfer conditions p2 (mm) | Laser processing conditions Pulse energy (mJ) | Laser processing conditions Beam diameter (mm) | p3 | p4 (°) | Electrolytic polishing conditions p5 | Electrolytic polishing conditions p6 (mm) | Rm (μm) | σA ($N/mm^2$) | Fatigue limit (MPa) |
|---|---|---|---|---|---|---|---|---|---|---|---|---|
| 101 | 6 | No chamfer | | 1 | 0.05 | 0.7 | 30 | 0.7 | 0.05 | 22 | −389 | 233 |
| 102 | 12 | No chamfer | | 9 | 0.16 | 0.75 | 30 | 0.8 | 0.06 | 25 | −569 | 244 |
| 103 | 22 | No chamfer | | 30 | 0.3 | 1 | 30 | 1.0 | 0.05 | 32 | −612 | 245 |
| 104 | 11 | No chamfer | | 100 | 0.6 | 1.5 | 30 | 1.6 | 0.06 | 41 | −842 | 251 |
| 105 | 25 | No chamfer | | 500 | 1.3 | 2 | 30 | 1.6 | 0.07 | 42 | −856 | 249 |
| 106 | 14 | No chamfer | | 0.2 | 0.03 | 0.65 | 30 | 0.7 | 0.05 | 22 | −186 | 213 |
| 107 | 7 | No chamfer | | 1 | 0.05 | 0.6 | 30 | 0.7 | 0.05 | 24 | −412 | 228 |
| 108 | 6 | No chamfer | | 1 | 0.05 | 0.55 | 30 | 0.7 | 0.05 | 20 | −176 | 220 |
| 109 | 21 | No chamfer | | 1 | 0.05 | 0.7 | 20 | 0.7 | 0.05 | 26 | −379 | 233 |
| 110 | 25 | No chamfer | | 1 | 0.05 | 0.7 | 10 | 0.7 | 0.05 | 23 | −356 | 227 |
| 111 | 11 | No chamfer | | 1 | 0.05 | 0.7 | 5 | 0.7 | 0.05 | 21 | −189 | 219 |
| 112 | 13 | No chamfer | | 30 | 0.3 | 1 | 30 | 0.7 | 0.05 | 24 | −588 | 236 |
| 113 | 12 | No chamfer | | 30 | 0.3 | 1 | 30 | 0.6 | 0.05 | 16 | −621 | 227 |
| 114 | 14 | No chamfer | | 30 | 0.3 | 1 | 30 | 0.56 | 0.05 | 12 | −625 | 224 |
| 115 | 22 | No chamfer | | 30 | 0.3 | 1 | 30 | 1.0 | 0.20 | 74 | −311 | 228 |
| 116 | 25 | No chamfer | | 30 | 0.3 | 1 | 30 | 1.0 | 0.40 | 132 | −178 | 220 |
| 117 | 12 | No chamfer | | 100 | 0.6 | 1.5 | 30 | 1.5 | 0.02 | 29 | −874 | 250 |
| 118 | 6 | No chamfer | | 100 | 0.6 | 1.5 | 30 | 1.5 | 0.01 | 22 | −657 | 246 |
| 119 | 13 | No chamfer | | 100 | 0.6 | 1.5 | 30 | 1.5 | 0.005 | 13 | −454 | 224 |
| 120 | 14 | No chamfer | | 100 | 0.6 | 1.5 | 30 | 1.3 | 0.30 | 116 | −296 | 226 |
| 121 | 21 | No chamfer | | 100 | 0.6 | 1.5 | 30 | 0.7 | 0.05 | 23 | −831 | 249 |
| 122 | 11 | 1.300 | 0.300 | 100 | 0.6 | 1.5 | 30 | 1.2 | 0.05 | 106 | −846 | 269 |
| 123 | 13 | 0.700 | 0.200 | 100 | 0.6 | 1.5 | 30 | 0.9 | 0.05 | 95 | −851 | 265 |
| 124 | 7 | 0.630 | 0.150 | 100 | 0.6 | 1.5 | 30 | 0.8 | 0.05 | 74 | −844 | 258 |
| 125 | 25 | 0.560 | 0.050 | 100 | 0.6 | 1.5 | 30 | 0.7 | 0.05 | 26 | −828 | 250 |
| 126 | 13 | No chamfer | | 100 | 0.6 | 1.5 | 30 | No polishing | | 9 | −414 | 221 |

TABLE 2

| Steel No. | C | Si | Mn | P | S | Cr | Mo | V | Ti | N | B | O | Ni | Co | Cu | W | Zr |
|---|---|---|---|---|---|---|---|---|---|---|---|---|---|---|---|---|---|
| | Invention steels (mass %) | | | | | | | | | | | | | | | | |
| 1 | 0.055 | 0.150 | 1.26 | 0.0110 | 0.0021 | 1.94 | 0.55 | 0.023 | 0.035 | 0.0075 | 0.0012 | 0.0037 | | | | | |
| 2 | 0.083 | 0.302 | 1.36 | 0.0251 | 0.0020 | 4.01 | 0.83 | 0.135 | 0.021 | 0.0038 | 0.0032 | 0.0015 | | | | | |
| 3 | 0.091 | 0.215 | 0.90 | 0.0120 | 0.0014 | 1.25 | 0.45 | 0.136 | 0.044 | 0.0026 | 0.0012 | 0.0024 | | | | | |
| 4 | 0.191 | 0.174 | 0.40 | 0.0039 | 0.0007 | 2.53 | 1.55 | 0.436 | 0.014 | 0.0050 | 0.0048 | 0.0038 | | | | | |
| 5 | 0.074 | 0.032 | 0.26 | 0.0103 | 0.0009 | 4.54 | 1.17 | 0.075 | 0.024 | 0.0068 | 0.0031 | 0.0072 | | | | | |
| 6 | 0.011 | 0.037 | 0.89 | 0.0071 | 0.0035 | 6.93 | 1.14 | 0.335 | 0.029 | 0.0020 | 0.0050 | 0.0059 | | | | | |
| 7 | 0.042 | 0.204 | 0.79 | 0.0047 | 0.0052 | 9.96 | 1.01 | 0.243 | 0.033 | 0.0046 | 0.0050 | 0.0026 | | | | | |
| 8 | 0.192 | 0.146 | 2.26 | 0.0145 | 0.0038 | 4.21 | 0.14 | 0.228 | 0.030 | 0.0027 | 0.0037 | 0.0015 | | | | | |
| 9 | 0.256 | 0.068 | 0.89 | 0.0142 | 0.0012 | 5.73 | 0.94 | 0.565 | 0.020 | 0.0023 | 0.0040 | 0.0030 | | | | | |
| 10 | 0.144 | 0.108 | 0.60 | 0.0066 | 0.0018 | 3.67 | 0.65 | 0.553 | 0.025 | 0.0028 | 0.0026 | 0.0009 | | | | | |
| 11 | 0.132 | 0.261 | 1.44 | 0.0061 | 0.0018 | 9.79 | 1.53 | 0.507 | 0.030 | 0.0076 | 0.0049 | 0.0056 | | | | | |
| 12 | 0.070 | 0.109 | 1.99 | 0.0087 | 0.0038 | 5.74 | 1.30 | 0.606 | 0.021 | 0.0011 | 0.0043 | 0.0065 | 0.20 | | 4.25 | | |
| 13 | 0.087 | 0.361 | 0.77 | 0.0145 | 0.0048 | 8.10 | 1.56 | 0.659 | 0.025 | 0.0055 | 0.0013 | 0.0023 | | 1.25 | | | |

TABLE 2-continued

| | | | | | | | | | | | | | | | | | |
|---|---|---|---|---|---|---|---|---|---|---|---|---|---|---|---|---|---|
| 14 | 0.199 | 0.136 | 1.52 | 0.0115 | 0.0037 | 6.51 | 0.88 | 0.201 | 0.033 | 0.0065 | 0.0049 | 0.0033 | | | 0.35 | | 0.016 |
| 15 | 0.225 | 0.287 | 1.73 | 0.0046 | 0.0013 | 2.64 | 1.02 | 0.314 | 0.017 | 0.0067 | 0.0025 | 0.0027 | | | | 0.41 | |
| 16 | 0.114 | 0.245 | 0.37 | 0.0035 | 0.0029 | 4.39 | 1.14 | 0.484 | 0.031 | 0.0027 | 0.0031 | 0.0066 | 0.03 | 0.02 | 0.05 | 0.16 | |
| 17 | 0.090 | 0.394 | 0.91 | 0.0052 | 0.0039 | 5.98 | 1.15 | 0.553 | 0.039 | 0.0069 | 0.0009 | 0.0033 | | | | | 0.003 |
| 18 | 0.213 | 0.106 | 1.39 | 0.0080 | 0.0050 | 9.62 | 1.18 | 0.506 | 0.021 | 0.0055 | 0.0013 | 0.0051 | | | | | |
| 19 | 0.167 | 0.160 | 0.13 | 0.0164 | 0.0022 | 6.64 | 0.74 | 0.275 | 0.020 | 0.0073 | 0.0043 | 0.0065 | 4.20 | | | 1.15 | 0.024 |
| 20 | 0.066 | 0.220 | 1.36 | 0.0113 | 0.0006 | 6.93 | 0.57 | 0.429 | 0.017 | 0.0062 | 0.0023 | 0.0010 | | | 0.07 | | |
| 21 | 0.118 | 0.317 | 1.98 | 0.0048 | 0.0021 | 9.15 | 0.28 | 0.251 | 0.036 | 0.0065 | 0.0034 | 0.0015 | | | | | |
| 22 | 0.232 | 0.312 | 1.26 | 0.0172 | 0.0032 | 7.63 | 1.35 | 0.678 | 0.023 | 0.0030 | 0.0024 | 0.0054 | 5.30 | | | 0.89 | |
| 23 | 0.183 | 0.281 | 0.07 | 0.0238 | 0.0020 | 5.72 | 1.56 | 0.483 | 0.023 | 0.0059 | 0.0017 | 0.0004 | | | 0.04 | | |
| 24 | 0.048 | 0.193 | 2.03 | 0.0113 | 0.0041 | 1.94 | 1.11 | 0.360 | 0.010 | 0.0028 | 0.0022 | 0.0012 | | | | | |
| 25 | 0.077 | 0.175 | 1.85 | 0.0218 | 0.0052 | 5.07 | 0.55 | 0.666 | 0.024 | 0.0077 | 0.0044 | 0.0048 | 6.80 | | | 0.76 | 0.041 |
| 26 | 0.128 | 0.090 | 1.71 | 0.0254 | 0.0019 | 4.34 | 0.86 | 0.093 | 0.011 | 0.0072 | 0.0028 | 0.0069 | | | | | |
| 27 | 0.015 | 0.058 | 0.54 | 0.0108 | 0.0010 | 9.30 | 1.28 | 0.245 | 0.021 | 0.0028 | 0.0006 | 0.0030 | | 0.05 | | | |

| | Invention steels (mass %) | | | | | | | | | | | | |
|---|---|---|---|---|---|---|---|---|---|---|---|---|---|
| Steel No. | Nb | Ta | Hf | Ca | Mg | Ba | Y | Ce | La | As + Sn + Sb + Pb + Zn | HTL | TS ($N/mm^2$) | CH (J) |
| 1 | | | | | | | | | | 0.0125 | 10.7 | 622 | 321 |
| 2 | | | | | | | | | | 0.0141 | 21.0 | 711 | 353 |
| 3 | | | | | | | | | | 0.0116 | 8.1 | 613 | 388 |
| 4 | | | | | | | | | | 0.0071 | 19.4 | 899 | 264 |
| 5 | | | | | | | | | | 0.0088 | 21.6 | 913 | 282 |
| 6 | | | | | | | | | | 0.0066 | 32.7 | 988 | 255 |
| 7 | | | | | | | | | | 0.0079 | 41.7 | 1030 | 196 |
| 8 | | | | | | | | | | 0.0081 | 22.3 | 886 | 286 |
| 9 | | | | | | | | | | 0.0044 | 27.9 | 871 | 244 |
| 10 | | | | | | | | | | 0.0099 | 18.2 | 732 | 293 |
| 11 | | | | | | | | | | 0.0036 | 43.3 | 1040 | 166 |
| 12 | | | | | | | | | | 0.0121 | 30.2 | 988 | 154 |
| 13 | | | | | | | | | | 0.0116 | 33.4 | 1020 | 288 |
| 14 | | | | | | | | | | 0.0113 | 31.8 | 964 | 332 |
| 15 | | | | | | | | | | 0.0098 | 17.7 | 763 | 312 |
| 16 | | | | | | | | | | 0.0094 | 22.1 | 804 | 366 |
| 17 | | | | | | | | | | 0.0071 | 23.9 | 853 | 306 |
| 18 | 0.016 | | | | | | | | | 0.0075 | 36.9 | 842 | 307 |
| 19 | | 0.120 | | | | | | | | 0.0069 | 36.8 | 924 | 256 |
| 20 | | | 0.061 | | | | | | | 0.0049 | 28.3 | 866 | 285 |
| 21 | 0.032 | | | 0.0035 | | | | | | 0.0081 | 36.9 | 943 | 361 |
| 22 | | | | | 0.0028 | | | | | 0.0099 | 40.8 | 1050 | 155 |
| 23 | 0.041 | | | 0.0039 | | 0.0022 | | | | 0.0098 | 24.5 | 821 | 386 |
| 24 | | | | | | | 0.0121 | | | 0.0096 | 14.5 | 729 | 332 |
| 25 | 0.035 | | | 0.0018 | | 0.0016 | | 0.0162 | | 0.0091 | 36.2 | 969 | 156 |
| 26 | 0.036 | 0.007 | | | 0.0035 | | | | 0.0263 | 0.0055 | 21.9 | 684 | 303 |
| 27 | | | | 0.0041 | | | 0.0421 | 0.0062 | | 0.0144 | 33.3 | 853 | 246 |

HTL 3.1(Cr %) + 1.2(Ni % + Co % + Mn %) + 2.0(Mo % + W %) + 0.8(Nb % + Zr % + V % + Ti % + Ta % + Hf %) + 2.7(C % + N %) + 1500(B %)
TS Tensile strength ($N/mm^2$) of liquid phase diffusion bonded joint at 25° C.
CH Absorbed energy (J) of liquid phase diffusion bonded joint at 0° C. in Charpy test

TABLE 3

| Steel | Comparative steels (mass %) | | | | | | | | | | | | | | | | |
|---|---|---|---|---|---|---|---|---|---|---|---|---|---|---|---|---|---|
| No | C | Si | Mn | P | S | Cr | Mo | V | Ti | N | B | O | Ni | Co | Cu | W | Zr |
| 51 | 0.360 | 0.100 | 0.46 | 0.0096 | 0.0021 | 5.14 | 1.52 | 0.624 | 0.025 | 0.0049 | 0.0029 | 0.0060 | | | | | |
| 52 | 0.176 | 0.820 | 2.06 | 0.0143 | 0.0044 | 1.11 | 0.60 | 0.619 | 0.032 | 0.0078 | 0.0039 | 0.0060 | | | | | |
| 53 | 0.173 | 0.316 | 3.28 | 0.0184 | 0.0013 | 7.75 | 0.83 | 0.538 | 0.032 | 0.0075 | 0.0007 | 0.0031 | | | | | |
| 54 | 0.118 | 0.314 | 0.44 | 0.0214 | 0.0007 | 15.50 | 1.26 | 0.527 | 0.027 | 0.0042 | 0.0042 | 0.0021 | | | | | |
| 55 | 0.208 | 0.241 | 0.41 | 0.0132 | 0.0011 | 9.52 | 3.50 | 0.386 | 0.013 | 0.0023 | 0.0015 | 0.0011 | | | | | |
| 56 | 0.180 | 0.208 | 0.68 | 0.0190 | 0.0041 | 4.28 | 0.62 | 1.460 | 0.025 | 0.0024 | 0.0044 | 0.0031 | | | | | |
| 57 | 0.196 | 0.205 | 1.94 | 0.0199 | 0.0004 | 3.61 | 1.23 | 0.185 | 0.060 | 0.0032 | 0.0019 | 0.0026 | | | | | |
| 58 | 0.122 | 0.281 | 0.64 | 0.0278 | 0.0023 | 5.46 | 1.27 | 0.274 | 0.013 | 0.0039 | 0.0160 | 0.0031 | | | | | |
| 59 | 0.148 | 0.133 | 0.93 | 0.0123 | 0.0034 | 4.37 | 1.10 | 0.348 | 0.035 | 0.0073 | 0.0047 | 0.0029 | 11.30 | | | | |
| 60 | 0.108 | 0.366 | 1.00 | 0.0119 | 0.0024 | 8.01 | 0.60 | 0.221 | 0.036 | 0.0043 | 0.0011 | 0.0065 | | 6.30 | | | |
| 61 | 0.171 | 0.288 | 1.37 | 0.0212 | 0.0023 | 1.31 | 1.38 | 0.623 | 0.017 | 0.0014 | 0.0051 | 0.0051 | 0.20 | | 7.16 | | |
| 62 | 0.036 | 0.088 | 0.62 | 0.0212 | 0.0031 | 2.95 | 0.75 | 0.194 | 0.025 | 0.0011 | 0.0015 | 0.0033 | | 1.25 | | 2.66 | |
| 63 | 0.140 | 0.358 | 0.07 | 0.0273 | 0.0004 | 9.91 | 0.10 | 0.343 | 0.023 | 0.0060 | 0.0022 | 0.0009 | | | 0.35 | | 0.092 |
| 64 | 0.229 | 0.032 | 2.24 | 0.0268 | 0.0019 | 5.92 | 0.26 | 0.685 | 0.039 | 0.0010 | 0.0026 | 0.0013 | | | | 0.41 | |
| 65 | 0.028 | 0.341 | 2.25 | 0.0109 | 0.0041 | 3.07 | 1.52 | 0.566 | 0.019 | 0.0042 | 0.0022 | 0.0045 | 0.03 | 0.02 | 0.05 | 0.16 | |
| 66 | 0.111 | 0.049 | 0.22 | 0.0122 | 0.0013 | 3.30 | 1.23 | 0.364 | 0.011 | 0.0025 | 0.0023 | 0.0043 | | | | | 0.003 |
| 67 | 0.153 | 0.204 | 2.48 | 0.0140 | 0.0018 | 5.81 | 0.25 | 0.232 | 0.039 | 0.0056 | 0.0031 | 0.0058 | | | | | |
| 68 | 0.179 | 0.177 | 2.19 | 0.0222 | 0.0025 | 8.32 | 0.65 | 0.255 | 0.031 | 0.0013 | 0.0044 | 0.0049 | 4.20 | | | 1.15 | 0.024 |
| 69 | 0.243 | 0.348 | 0.91 | 0.0141 | 0.0023 | 7.97 | 1.06 | 0.525 | 0.034 | 0.0071 | 0.0011 | 0.0024 | | | 0.07 | | |
| 70 | 0.137 | 0.397 | 0.28 | 0.0188 | 0.0025 | 5.57 | 1.24 | 0.406 | 0.015 | 0.0051 | 0.0006 | 0.0054 | | | | | |

TABLE 3-continued

| | | | | | | | | | | | | | | | | |
|---|---|---|---|---|---|---|---|---|---|---|---|---|---|---|---|---|
| 71 | 0.044 | 0.106 | 0.37 | 0.0275 | 0.0018 | 8.07 | 1.01 | 0.448 | 0.024 | 0.0056 | 0.0039 | 0.0064 | 5.30 | | | 0.89 | |
| 72 | 0.157 | 0.054 | 0.65 | 0.0110 | 0.0044 | 1.06 | 0.19 | 0.514 | 0.033 | 0.0072 | 0.0031 | 0.0030 | | | 0.04 | | |
| 73 | 0.169 | 0.016 | 0.93 | 0.0037 | 0.0018 | 5.03 | 1.35 | 0.482 | 0.039 | 0.0049 | 0.0046 | 0.0069 | | | | | |
| 74 | 0.002 | 0.006 | 0.02 | 0.0133 | 0.0020 | 1.11 | 0.16 | 0.031 | 0.014 | 0.0026 | 0.0003 | 0.0064 | | | | 0.76 | 0.041 |

| | Comparative steels (mass %) | | | | | | | | | | | |
|---|---|---|---|---|---|---|---|---|---|---|---|---|
| Steel No | Nb | Ta | Hf | Ca | Mg | Ba | Y | Ce | La | As + Sn + Sb + Pb + Zn | HTL | TS (N/mm2) | CH (J) |
| 51 | | | | | | | | | | 0.0081 | 25.4 | 622 | 23 |
| 52 | | | | | | | | | | 0.0018 | 14.0 | 711 | 16 |
| 53 | | | | | | | | | | 0.0014 | 31.6 | 775 | 11 |
| 54 | | | | | | | | | | 0.0007 | 58.1 | 314 | 264 |
| 55 | | | | | | | | | | 0.0042 | 40.1 | 913 | 26 |
| 56 | | | | | | | | | | 0.0016 | 23.6 | 938 | 32 |
| 57 | | | | | | | | | | 0.0136 | 19.6 | 1030 | 33 |
| 58 | | | | | | | | | | 0.0036 | 44.8 | 521 | 244 |
| 59 | | | | | | | | | | 0.0090 | 38.3 | 732 | 23 |
| 60 | | | | | | | | | | 0.0075 | 37.0 | 1040 | 16 |
| 61 | | | | | | | | | | 0.0068 | 17.4 | 988 | 13 |
| 62 | | | | | | | | | | 0.0057 | 20.8 | 1020 | 24 |
| 63 | | | | | | | | | | 0.0147 | 35.0 | 964 | 16 |
| 64 | 0.071 | | | | | | | | | 0.0078 | 27.5 | 763 | 12 |
| 65 | | 0.260 | | | | | | | | 0.0126 | 19.8 | 804 | 8 |
| 66 | | | 0.310 | | | | | | | 0.0066 | 17.1 | 853 | 16 |
| 67 | 0.016 | | | 0.0070 | | | | | | 0.0105 | 26.9 | 842 | 21 |
| 68 | | 0.120 | | | 0.0060 | | | | | 0.0101 | 44.6 | 924 | 22 |
| 69 | | | 0.061 | | | 0.0065 | | | | 0.0002 | 30.6 | 866 | 25 |
| 70 | 0.062 | | | 0.0035 | | | 0.0920 | | | 0.0070 | 21.8 | 943 | 44 |
| 71 | | | | | 0.0028 | | | 0.0860 | | 0.0023 | 42.1 | 1050 | 43 |
| 72 | 0.041 | | | 0.0039 | | 0.0022 | | | 0.0660 | 0.0031 | 9.9 | 821 | 16 |
| 73 | | | | | | | 0.0121 | | | 0.0189 | 27.2 | 729 | 8 |
| 74 | 0.035 | | | 0.0018 | | 0.0016 | | 0.1620 | | 0.0034 | 5.9 | 455 | 24 |

HTL 3.1(Cr %) + 1.2(Ni % + Co % + Mn %) + 2.0(Mo % + W %) + 0.8(Nb % + Zr % + V % + Ti % + Ta % + Hf %) + 2.7(C % + N %) + 1500(B %)
TS Tensile strength ($N/mm^2$) of liquid phase diffusion bonded joint at 25° C.
CH Absorbed energy (J) of liquid phase diffusion bonded joint at 0° C. in Charpy test

INDUSTRIAL APPLICABILITY

The present invention utilizes diffusion bonding to produce common rails having high strength steel of 600 MPa and higher class. The diffusion bonding enables to produce the common rails from block units having shapes are easy to process and therefore enables production cost reduction. Moreover, at the opening peripheries of branch holes on the rail hole side of a common rail, which are regions where fatigue strength becomes an issue, high compressive stress can be introduced from the surface while simultaneously mitigating stress concentration by improving the shape of the branch hole opening regions, thereby markedly improving fatigue strength. As a result, it becomes possible to build a common rail system capable of high-pressure fuel injection using an inexpensive steel, thus making it possible to realize greener exhaust emissions and enhanced fuel efficiency. Moreover, the invention can also be applied to production methods for improving the fatigue strength of machine components having a fluid passage that is liable to experience stress concentration at the ends of the fluid-conveying tube and regions of the tube where its diameter changes radical. The invention therefore has high industrial utility.

What is claimed is:

1. A method of producing a common rail, wherein the common rail is tubular, having a cylindrical wall enclosing a rail hole and multiple branch holes formed in the cylindrical wall, the branch holes connected to the rail hole, and wherein the cylindrical wall of the common rail is a steel for high-strength liquid phase diffusion bonding having good toughness and fatigue strength, the steel comprising, in mass %, C: 0.01 to 0.3%, Si: 0.01 to 0.5%, Mn: 0.01 to 3.0%, Cr: 1.0 to 12.0%, Mo: 0.1 to 2.0%, V: 0.01 to 1.0%, B: 0.0003 to 0.01%, Ti: 0.01 to 0.05%, N: 0.001 to 0.01%, a P content limited to 0.03% or less, a S content limited to 0.01% or less, an O content limited to 0.01% or less, a total content of grain boundary segregated embrittling elements As, Sn, Sb, Pb and Zn limited to 0.015% or less, and a balance of unavoidable impurities and Fe;

the method comprising:

obtaining liquid phase diffusion bonded steel in a shape approximately that of the common rail;

laser-peening with a pulsed laser beam a proximal region of a boundary between the inner surface of each branch hole and the inner surface of the rail hole, wherein the irradiated region is in contact with a transparent liquid; and removing a surface layer of steel from a region of the opening peripheral zone where a residual compression stress is reduced by melting and resolidification owing to the laser-peening, thereby increasing the fatigue strength of the opening peripheral zone.

2. The method of producing a common rail according to claim 1, wherein the steel for liquid phase diffusion bonding further comprises, in mass %, one or more of Ni: 0.01 to 9.0%, Co: 0.01 to 5.0%, Cu: 0.01 to 5.0%, and W: 0.01 to 2.0%.

3. The method of producing a common rail according to claim 1, wherein the steel for liquid phase diffusion bonding further comprises, in mass %, one or more of Zr: 0.001 to 0.05%, Nb: 0.001 to 0.05%, Ta: 0.001 to 0.2%, and Hf: 0.001 to 0.2%.

4. The method of producing a common rail according to claim 1, wherein the steel for liquid phase diffusion bonding further comprises, in mass %, one or more sulfide shape control elements selected from the group consisting of Ca:

0.0005 to 0.005%, Mg: 0.0005 to 0.005%, Ba: 0.0005 to 0.005%, and one or more rare earth elements selected from the group consisting of Y: 0.001 to 0.05%, Ce: 0.001 to 0.05%, La: 0.001 to 0.05%.

5. The method of producing a common rail according to claim 1, wherein the step of removing the surface layer of steel is conducted by at least one of electrolytic polishing and fluid polishing.

6. The method of producing a common rail according to claim 1, wherein the pulsed laser beam has a pulse energy of 1 mJ to 10 J.

7. The method of producing a common rail according to claim 1, wherein the laser-peened zone and the zone having a surface layer removed each includes a zone at the inner surface of the rail hole, wherein the zone at the inner surface of the rail hole satisfies:

i) a distance from a center of a branch hole is less than or equal to 0.6 times a diameter of a branch hole, and ii) an angle between a line segment drawn to the branch hole center and a longitudinal direction of the rail hole is less than or equal to 10°, and more than or equal to −10°, and the removed surface layer in the zone at the inner surface of the rail hole has a thickness of 0.01 mm to 0.3 mm.

8. The method of producing a common rail according to claim 1, wherein the removal of the surface layer of steel of the opening peripheral zone provides a shape line at the opening peripheral zone of the branch hole viewed in a cross-section extending in a longitudinal direction of the rail hole and including a center line of the branch hole having a radius of curvature of at least 15 μm at points of a region wherein 0.5 times a diameter of a branch hole is less than or equal to a distance from a center of a branch hole, and the distance from the center of the branch hole is less than or equal to a diameter of 0.6 times the diameter of the branch hole.

9. The method of producing a common rail according to claim 1, further comprising chamfering the opening peripheral zone before laser-peening.

10. The method of producing a common rail according to claim 9, wherein the chamfered zone includes the zone wherein the zone satisfies:

i) a distance from a center of a branch hole is less than or equal to 0.6 times a diameter of the branch hole, and ii) an angle between a line segment drawn to the branch hole center and a longitudinal direction of the rail hole is less than or equal to 10°, and more than or equal to −10°.

11. The method of producing a common rail according to claim 1, wherein the transparent liquid is an alcohol or water containing a rust inhibitor.

* * * * *